United States Patent [19]

Huizinga et al.

[11] 4,046,972
[45] Sept. 6, 1977

[54] KEY TELEPHONE STATION SET CIRCUIT

[75] Inventors: Donald Dean Huizinga, Indianapolis; Edward William Underhill, Knightstown; James Arthur Whitcomb, Indianapolis, all of Ind.

[73] Assignee: Bell Telephone Laboratories, Incorporated, Murray Hill, N.J.

[21] Appl. No.: 735,991

[22] Filed: Oct. 27, 1976

[51] Int. Cl.[2] .......................................... H04Q 5/18
[52] U.S. Cl. ................................. 179/99; 179/84 L; 179/84 T
[58] Field of Search .................. 179/99, 18 J, 18 F, 179/18 FA, 84 T, 84 L

[56] References Cited

U.S. PATENT DOCUMENTS

| 3,146,314 | 8/1964 | Boehly et al. | 179/84 T |
|---|---|---|---|
| 3,385,935 | 5/1968 | Anderson et al. | 179/99 |
| 3,519,757 | 7/1970 | Anderson et al. | 179/18 |
| 3,763,326 | 10/1973 | Murtu et al. | 179/99 |
| 3,843,845 | 10/1974 | Ridley | 179/99 |
| 3,906,168 | 9/1975 | McEdwen | 179/99 |
| 3,935,396 | 1/1976 | Barsellotti et al. | 179/99 |
| 3,946,146 | 3/1976 | Brown et al. | 179/99 |
| 3,973,085 | 8/1976 | Shiff | 179/99 |
| 3,991,282 | 11/1976 | Feil | 179/99 |

Primary Examiner—Kathleen H. Claffy
Assistant Examiner—Gerald L. Brigance
Attorney, Agent, or Firm—John W. Fisher

[57] ABSTRACT

An electronic key telephone station set includes a plurality of nonlocking line selection buttons. Adjacent each button is a pair of light emitting diode lamps, one for indicating which line selection button has been actuated and one for indicating which ones of other lines having an appearance on the station set are in use. Digital data coupled to and from the station set control the activation of the indicating lamps as well as the type of alerting signal generated to indicate an incoming call. Numerous other features may be advantageously implemented under data stream control.

16 Claims, 15 Drawing Figures

FIG. 5C
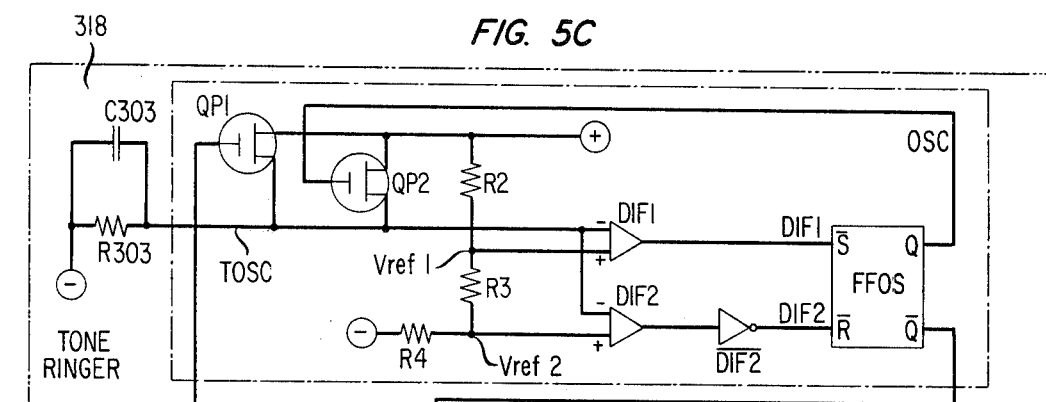
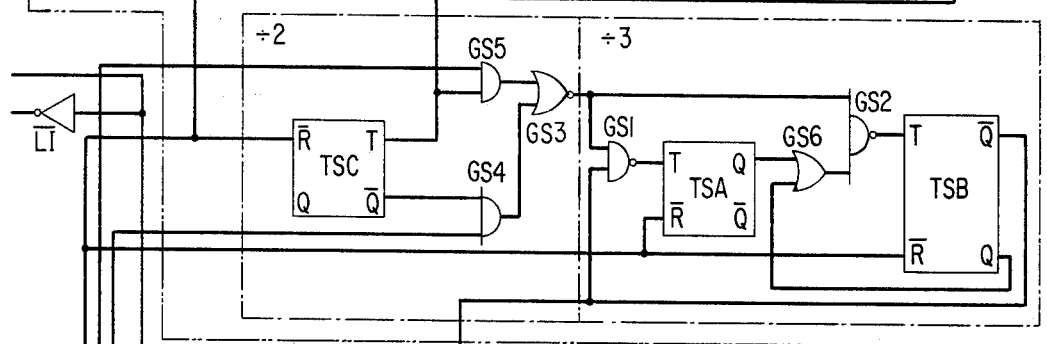
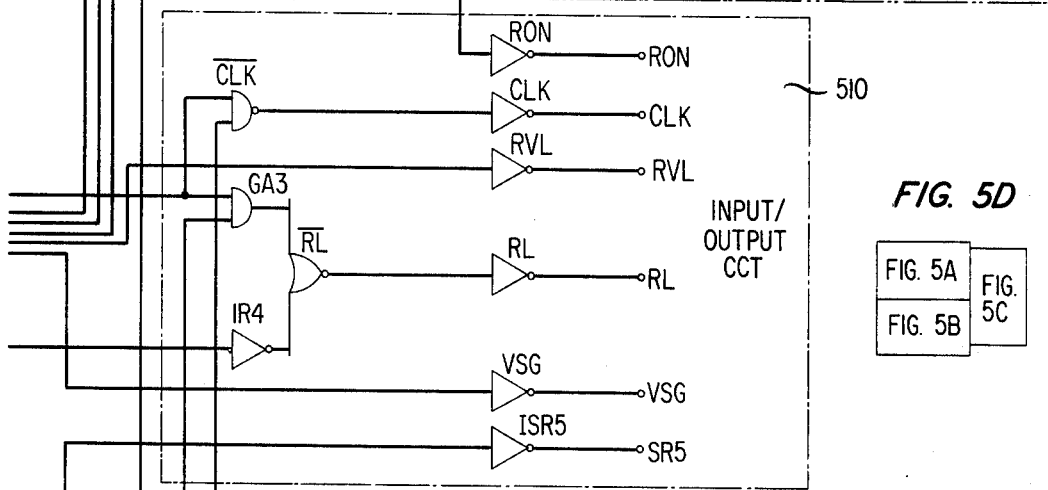
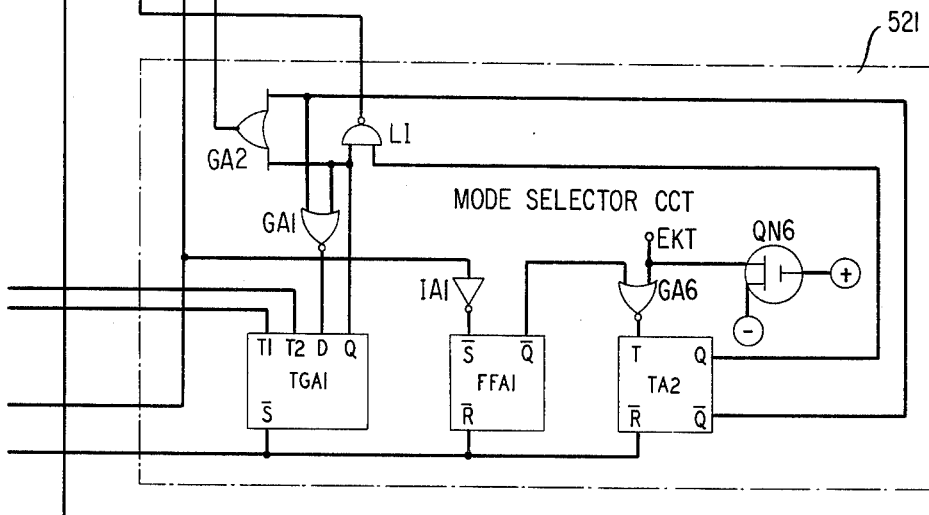
FIG. 5D
| FIG. 5A | FIG. |
|---|---|
| FIG. 5B | 5C |

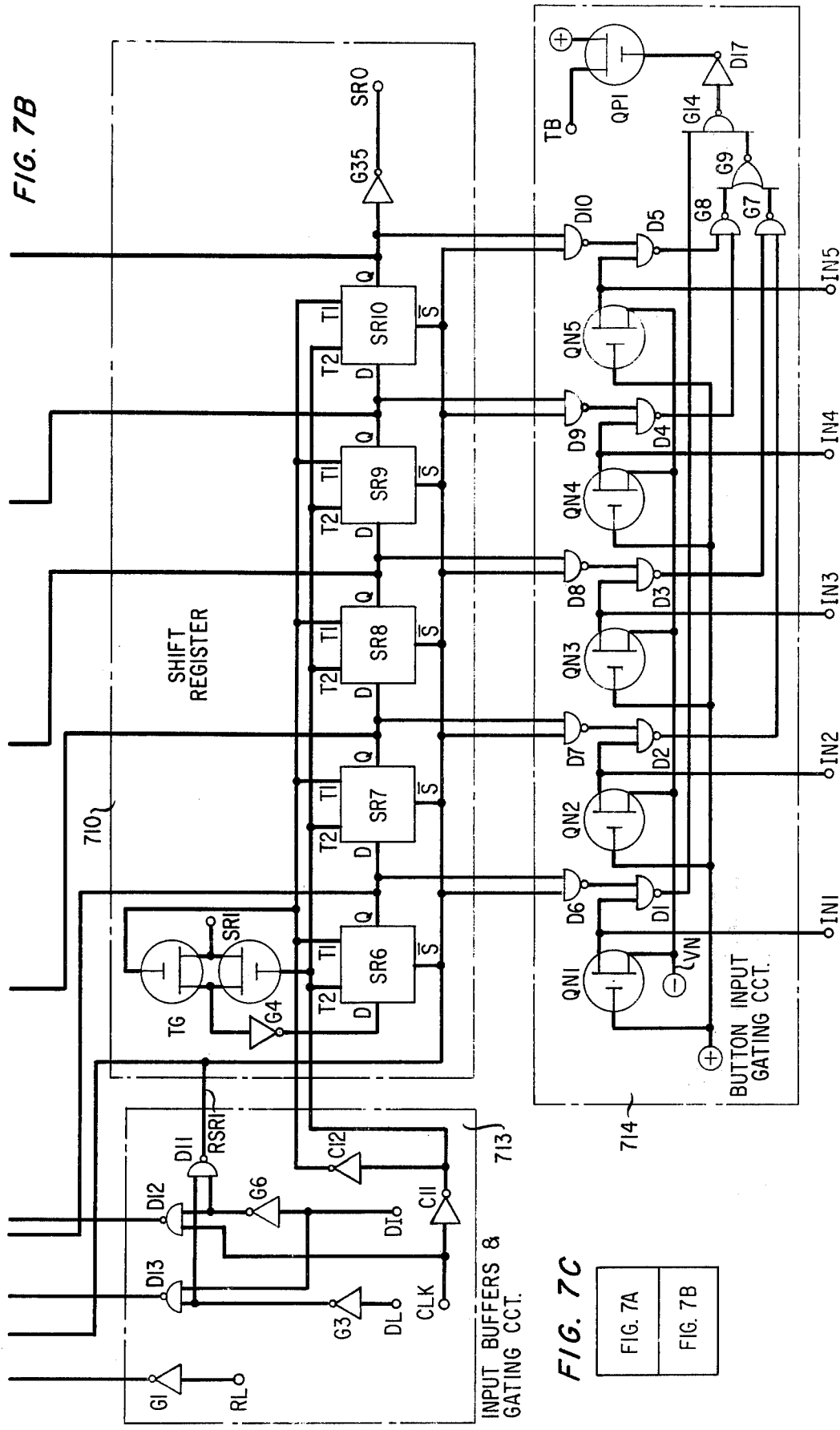

| FIG. 8A |
| FIG. 8B |

KEY TELEPHONE STATION SET CIRCUIT

BACKGROUND OF THE INVENTION

1. Field of the Invention

This invention relates to telephone station set circuits and, in particular, to circuits responsive to digital control signals for implementing key telephone functions at the station set.

2. Description of the Prior Art

Since the advent of key telephone systems several years ago, there has been an increasing demand that more and more service features be made available to the customer. Implementation of these additional features, such as call hold, operator recall, and the like, has generally required additional circuits within the station set itself as well as additional lines between the station set and a centrally located controller. At some point both size and cost considerations have rendered this method of implementation prohibitive. For example, it was not uncommon to have as many as 25 pairs of lines connecting the station set to the controller. With the frequent shift of personnel utilizing key telephone apparatus, the time and expense involved to effect a relocation has become excessive.

To circumvent these problems, the recent trend has been toward implementation of key telephone service features by means of signal multiplexing techniques. Multiplexing numerous signals for transmission over a given conductor pair has permitted a substantial reduction in the number of pairs which must be utilized for interconnection. Although this approach has alleviated to some extent the cost and space problems, it has been less than totally successful. As before, the addition of other customer service features has required modifications and changes in the circuits.

With the addition of other features, the amount of power required to drive these circuits has greatly increased. In many applications it is desirable to have the telephone system totally divorced from the commercial power system. For such applications many of the revised system designs have been found unsuitable. Other system designs, specifically directed toward operation on telephone system supplied power, have not proved successful because of excessive power drain caused by the numerous added features.

Accordingly, it is one object of the present invention to reduce the number of signal leads into and out of the station set which, in turn, facilitates concentration of the number of leads into a cross connection network.

Another object is to implement special customer service features by data stream control.

A further object of the present invention is to utilize large scale integrated circuit technology to reduce the cost and size of the circuits, to decrease the amount of power required to drive the circuits, to improve overall circuit reliability, and to reduce the number of lumped element components required.

Still another object is to simplify key design and thereby make it more reliable by incorporating a single contact, nonlocking button in conjunction with a pair of light emitting diode lamps, one indicating the button-in-use status and the other indicating line status.

Yet a further object of the present invention is to use a direct drive for the light emitting diodes thereby reducing the number of components required and the amount of power supply noise.

SUMMARY OF THE INVENTION

The foregoing and other objects of the invention are realized in an illustrative embodiment of a key telephone station set circuit which includes apparatus for selecting one of a plurality of apparent telephone lines having an appearance at the station set. Circuits, responsive to the selecting apparatus, produce digital data indicating which of the apparent telephone lines is selected. Additional circuits, which are responsive to digital data transmitted to the station set, produce an indication of which one of the apparent telephone lines is selected and which ones of the apparent telephone lines are in an operational mode at other station sets having in common the plurality of apparent lines. Other circuits, which are also responsive to the digital data transmitted to the station set, control the volume and the frequency of oscillation of an alerting signal indicating an incoming call to the station set.

Accordingly, it is one feature of the present invention that ringer volume and pitch are selectable under data stream control.

Another feature is that power to drive the station set circuits is phantomly coupled to the station set on the control signal leads.

A further feature of the present invention is that the station set circuits include a recall key for signaling an operator via the data stream thereby circumventing the problems of a dropped connection resulting from switchhook flash operator recall.

Still another feature is that implementation of additional or special customer service features can be advantageously effected under control of the data stream as contrasted with wiring changes.

Yet a further feature of the present invention is that large scale integrated circuit technology is employed thereby enabling the key telephone station set circuits to be driven from a remote power source.

BRIEF DESCRIPTION OF THE DRAWINGS

The aforementioned objects and features of the invention, as well as other objects and features, will be better understood upon a consideration of the following detailed description and the appended claims taken in conjunction with the attached drawings of an illustrative embodiment in which:

FIG. 5 when FIGS. 5a, 5b and 5c are arranged as shown in FIG. 5d, is a schematic circuit diagram illustrating the data decoding and storage elements and the dual volume, dual pitch tone ringer circuit;

FIG. 7, when FIGS. 7a and 7b are arranged as shown in FIG. 7c, illustrates the light emitting diode lamp driver circuits; and FIG. 8, when

DETAILED DESCRIPTION

1. Overview of System Operation

Figure 1:
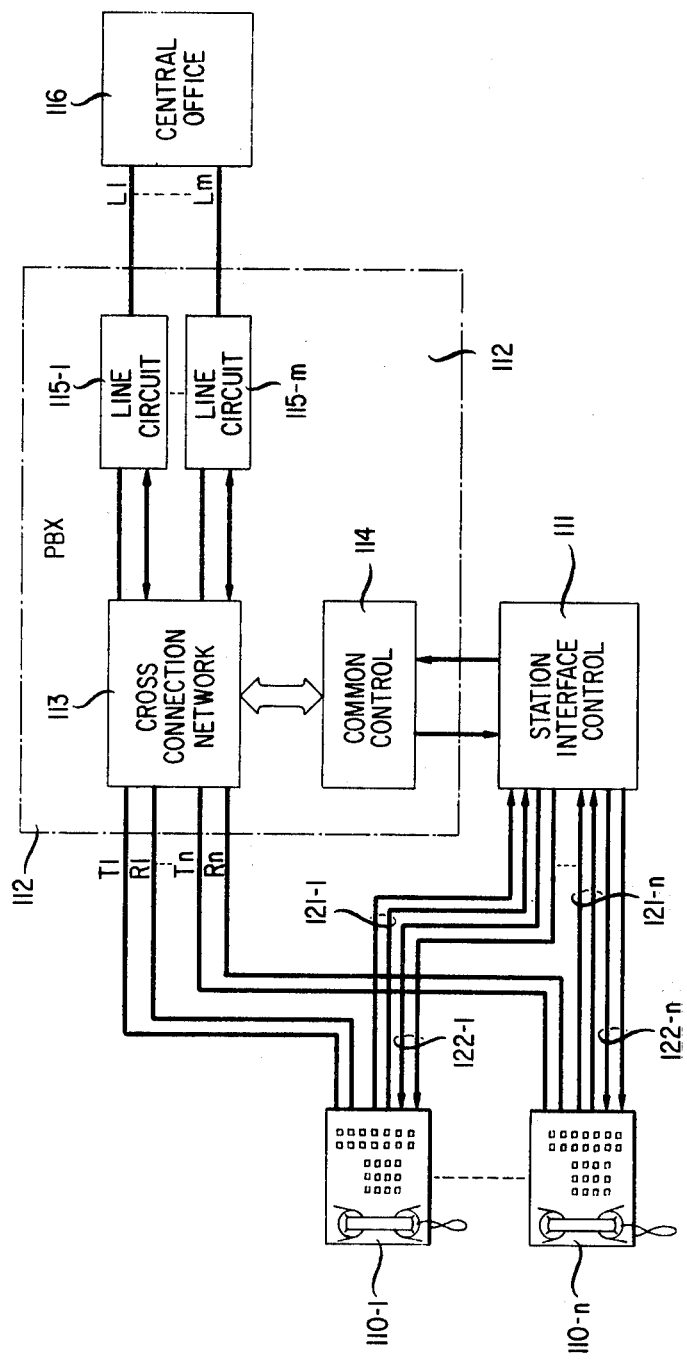
FIG. 1 is a simplified block diagram showing the interconnections between the station set and other centrally located apparatus.

The simplified block diagram of FIG. 1 illustrates the interconnections among all major components to effect key telephone system operation. Specifically, there is shown a number of key telephone station sets designated 110-1 through 110-n. Each of the station sets 110 is connected to a PBX 112 by a two-wire talking path designated T and R. In particular, station set 110-1 is connected to PBX 112 by leads T1 and R1 and station set 110n is connected via leads Tn and Rn.

Data is transmitted from station sets 110 via leads 121 to a station interface controller 111. Correspondingly, data from interface controller 111 is transmitted via leads 122 to station sets 110. The exchange of data between interface controller 11 and cross-connection network 113, to establish a path through network 113, is effected through common control network 114. Once a path through network 113 is established, a connection to central office 116 is completed via one of line circuits 115-1 through 115m and one of lines L1 through Lm.

2. Brief Physical Description of Station Set

Figure 2:
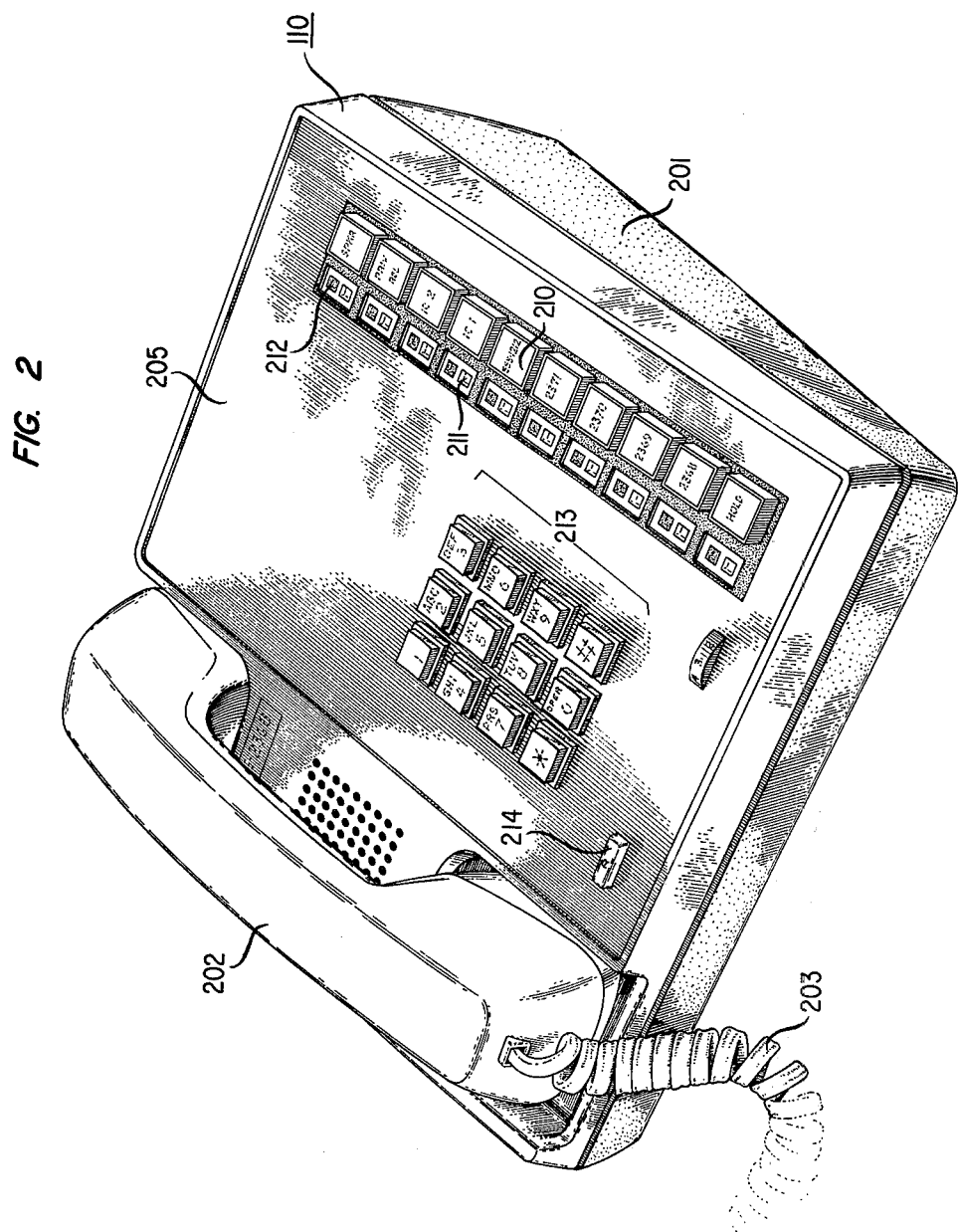
FIG. 2 illustrates the physical design of the station set.

Station set 110, as shown in FIG. 2, includes housing 201 and hand set 202 which is interconnected with circuits in station set 110 by cord 203. On a top surface of housing 201 is face plate 205. Along the right-hand side of face plate 205 there is mounted a plurality of non-locking line selection pushbuttons 210. Adjacent to each of buttons 210 are a pair of light emitting diode (LED) lamps 211 and 212. LED 211 provides a visual indication of which ones of the lines having an appearance on station set 110 are in use at other locations. LED 212 provides a visual display as to which one of buttons 210 has been selected by a user.

It should be noted at this point that even though ten lines are shown as having an appearance on station set 110, only a single talking pair T and R connect the set to PBX 112, shown in FIG. 1. It should be noted also that station sets 110 may be advantageously configured to permit ten, twenty, thirty or more lines to have an appearance on the set. However, even for these configurations, only a single talking pair T and R interconnect set 110 with PBX 112.

To complete this brief physical description of station set 110, attention should be directed to the left central region of face plate 205 at which is located pushbutton dial 213. Near the lower left-hand corner of face plate 205 is an operator recall key 214.

3. Brief Description of Station Set Circuits

Figure 3:
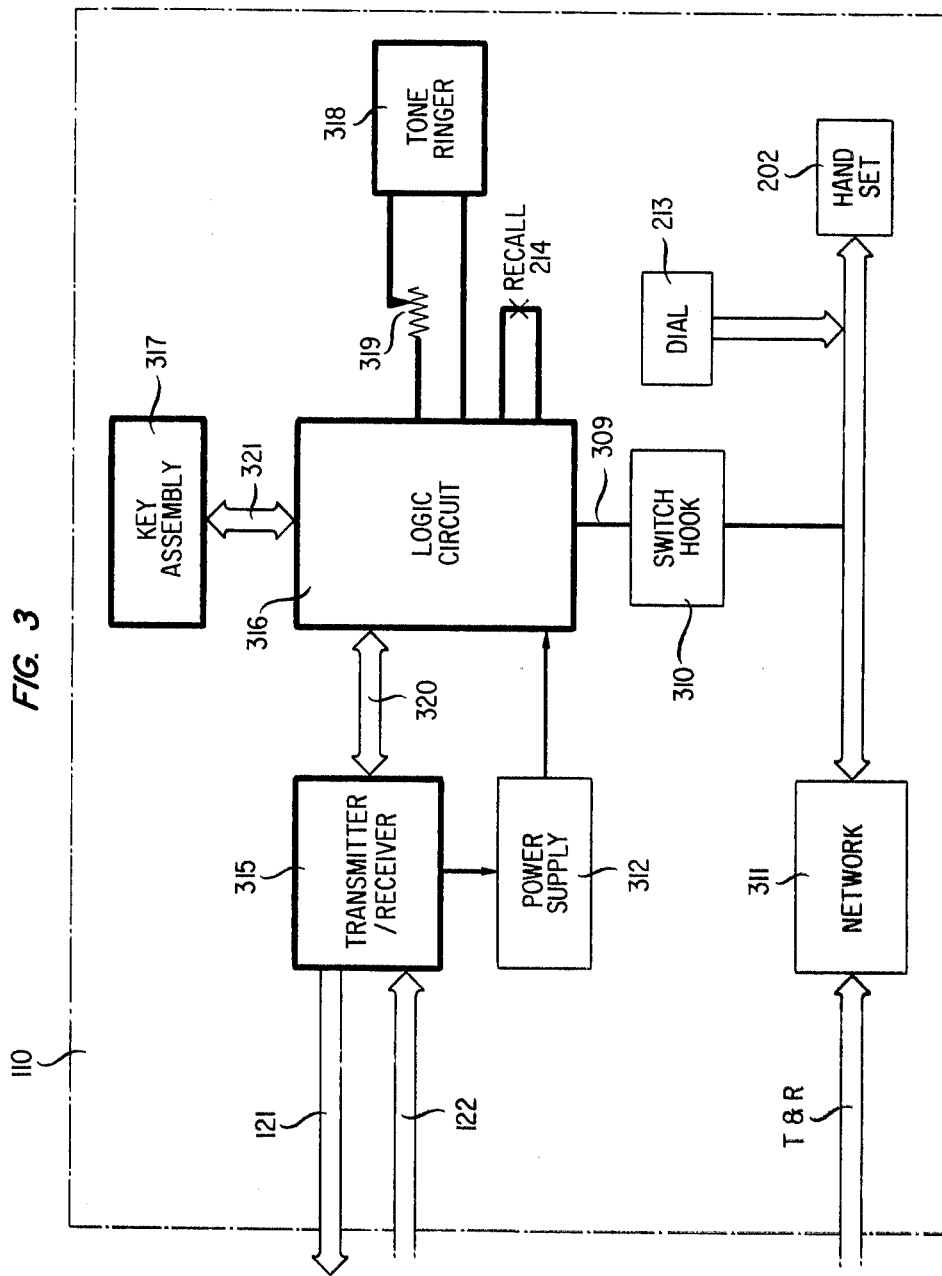
FIG. 3 is a simplified block diagram of the circuits within the station set.

The circuits within station set 110 are shown in the simplified block diagram of FIG. 3. Many of the circuits, such as handset 202, dial 213, switchhook 310, and network 311 are standard telephone components. Switchhook 310 is modified to have an extra lead 309 for transmitting data to logic circuit 316. Otherwise there are no other changes. Consequently, little else need be said about these components. Power supply 312 is designed to receive power phantomed on data lines 121 and 122 and convert the received power into the requisite voltage for operating logic circuit 316 and key assembly 317. However, with regard to the remaining components, which are shown in bold face outlines, the bulk of the following discussion will concentrate on them.

In particular, data to station set 110 arrives via leads 122 and is conditioned in transmitter/receiver circuit 315. Since power is supplied over the data lines, transmitter/receiver circuit 315 separates the data from the power. The power signal is routed to power supply 312 which generates the requisite voltages needed to operate logic circuit 316.

Incoming data, following conditioning by transmitter/receiver circuit 315, are routed to logic circuit 316 over a number of signal paths illustrated collectively as leads 320. Logic circuit 316 operates upon the data, referred to as lamp data, to initiate the alerting function effected by tone ringer 318. Potentiometer 319 permits manual control of the volume of the alerting signal produced by tone ringer 318. Also, signals to light the LED lamps are developed and routed to key assembly 317 via leads 321.

Actions taken by the user with respect to the buttons 210 produce signals which are coupled from key assembly 317 back to logic circuit 316. These signals are further manipulated by logic circuit 316 and are then coupled to transmitter/receiver circuit 315. After conditioning, the signals are transmitted to interface controller 111.

4. General Description of Station Set Operation

In operation, data from interface controller 111 regulates ringer and LED lamp actuation, volume, and voice signaling if the latter is to be provided as one of the customer service features in station set 110. Sufficient data is sent from interface controller 111 to service all LED lamps 211 and 212 in station set 110 regardless of the number of apparent lines having an appearance at the set. The data referred to above is sent to each station set 110, one set at a time, approximately every 25 milliseconds. Hence, interface controller 111 completes a scan of all station sets 110 in approximately 25 milliseconds. The actual length of a data word coupled to station set 110 depends upon the number of buttons 210 and LED lamps 211 and 212 provided on the set, the number of features to be implemented, and the amount of overhead data manipulation that must be effected.

Upon receipt of data by station set 110, return data is generated to indicate the status of the switchhook and the status of all buttons on the set, whether operated or not. Keeping in mind that numerous custom calling features such as call forwarding, voice signaling, handsfree answer and call hold among others can be advantageously implemented under data stream control, operation of station set 110 will become clear upon consideration of the two major types of calls that may occur. The types of calls to be considered are outgoing calls and incoming calls.

4.1 Outgoing Call

The first step undertaken by a user in placing an outgoing call is to lift handset 202 thereby causing station set 110 to go into an off-hook state. Recalling that data is transferred between station set 110 and interface controller 111 approximately every 25 milliseconds, station set 110 being in an off-hook state causes the first bit in the data word transmitted to interface controller 111 to go to a high logic level. A typical definition of a data word from station set 110 is presented in Table 1 as button data period. Similarly, a definition of a data word to station set 110 is presented in Table 1 as lamp data period. Once the switchhook bit goes high, it continues to be transmitted as such so long as station set 110 remains in the off-hook state.

TABLE 1

LAMP AND BUTTON DATA DEFINITIONS

| | | Controlled State | | | | Controlling State | |
|---|---|---|---|---|---|---|---|
| Lamp Data Period | Controlled Function | "Zero" Lamp State | "One" Lamp State | Button Data Period | Controlling Function | "Zero" Button State | "One" Button State |
| 1 | Ringer ON/OFF | | | 1 | switchhook | On-Hood | Off-Hook |
| 2 | | | | 2 | Button Common | # | # |
| 3 | Ringer Tone | 750 Hz | 1500 Hz | 3 | Data Stream Dialing | Open | Closed |
| 4 | Ringer Volume | Full | Reduced | 4 | Direct Sta. Selection | Open | Closed |
| 5 | Voice Signaling | OFF | ON | 5 | Recall | Open | Closed |
| 6 | L1 LED | OFF | ON | 6 | Button 1 | Open | Closed |
| 7 | I1 LED | OFF | ON | *NT | | | |
| 8 | L2 LED | OFF | ON | 7 | Button 2 | Open | Closed |
| 9 | I2 LED | OFF | ON | NT | | | |
| 10 | L3 LED | OFF | ON | 8 | Button 3 | Open | Closed |
| 11 | I3 LED | OFF | ON | NT | | | |
| 12 | L4 LED | OFF | ON | 9 | Button 4 | Open | Closed |
| 13 | I4 LED | OFF | ON | NT | | | |
| 14 | L5 LED | OFF | ON | 10 | Button 5 | Open | Closed |
| 15 | I5 LED | OFF | ON | NT | | | |
| 16 | L6 LED | OFF | ON | 11 | Button 6 | Open | Closed |
| 17 | I6 LED | OFF | ON | NT | | | |
| 18 | L7 LED | OFF | ON | 12 | Button 7 | Open | Closed |
| 19 | I7 LED | OFF | ON | NT | | | |
| 20 | L8 LED | OFF | ON | 13 | Button 8 | Open | Closed |
| 21 | I8 LED | OFF | ON | NT | | | |
| 22 | L9 LED | OFF | ON | 14 | Button 9 | Open | Closed |
| 23 | I9 LED | OFF | ON | NT | | | |
| 24 | L10 LED | OFF | ON | 15 | Button 10 | Open | Closed |
| 25 | I10 LED | OFF | ON | NT | | | |

# = "0" only if all subsequent button data bits "0".
*= No Transmitted Bit.

At this point the user presses a key button to select a line. For present purposes, assume button 1 is depressed. Consequently, bits 2 and 6 from station set 110 to interface controller 111 go high. In the data word returned to station set 110, bits 6 and 7 are high causing line 1 lamps L1 and I1 to light. At the same time tip and ring leads, T and R, are energized or connected to set 110 and dial tone is returned. Thereupon the user dials the desired number. It should be noted that any other station sets 110 with line 1 appearing thereon receive data from interface controller 111 to light their L1 lamps.

When the user hangs up, the switchhook bit goes low and all lamps for line 1 are extinguished.

4.2 Incoming Call

For an incoming call, data bits are sent during the course of a sequential scan by interface controller 111 of station set 110. These bits control ringing as well as the lighting of lamps. Tone ringer 318, about which more will be said later, oscillates at either 750 Hz or 1500 Hz. Interface controller 111 can advantageously select which of these frequencies is to be produced and also the interval during which it is produced. For example, during one scan period 750 Hz may be advantageously generated whereas on the next scan 1500 Hz may be advantageously generated. Another possibility is to turn one of the aforementioned frequency signals on during one data period and off during the next data period thereby producing approximately a 20 Hz modulation in the ringing signal. Still further it is possible to use the low frequency signal for indicating an outside call with the high frequency signal indicating an in-house call. Frequency selection and the ringer on/off function are under the control of bits 1, 2, and 3 of the lamp data word as shown in Table 1.

Similarly, the volume of the alerting signal can be advantageously controlled by the data stream. For instance, if bit 4 of the lamp data is low the volume is normal whereas if the bit is high the volume is reduced.

During the course of the alerting function, data is also sent to station set 110 to turn on and off the L-lamp corresponding to the line being rung. The rate of turn-on and turn-off is also under data stream control.

Until there is an answer, the data back to interface controller 111 is unchanged. However, once station set 110 is put into an off-hook state by an answering user, the switchhook bit back to interface controller 111 goes high.

For purposes of the following discussion, assume line 1 is being rung. Upon lifting handset 202, the user presses button 210 next to line 1. The flashing of lamp L1 now goes to a steady-on state and lamp I1 comes on and goes to a steady-on state. At the same time tone ringing is terminated; tip and ring leads, T and R, are energized; and the call connection is completed. Everything remains the above-defined state until station set 110 is returned to an on-hook state at which time the L1 lamp is extinguished.

It should be somewhat apparent from the above discussion that the first several bits in each data word are devoted to overhead type functions and the remaining bits are devoted to lamp and button functions. A typical example of each bit function is set out in Table 1.

5. Transmitter/Receiver Circuit

Figure 4:
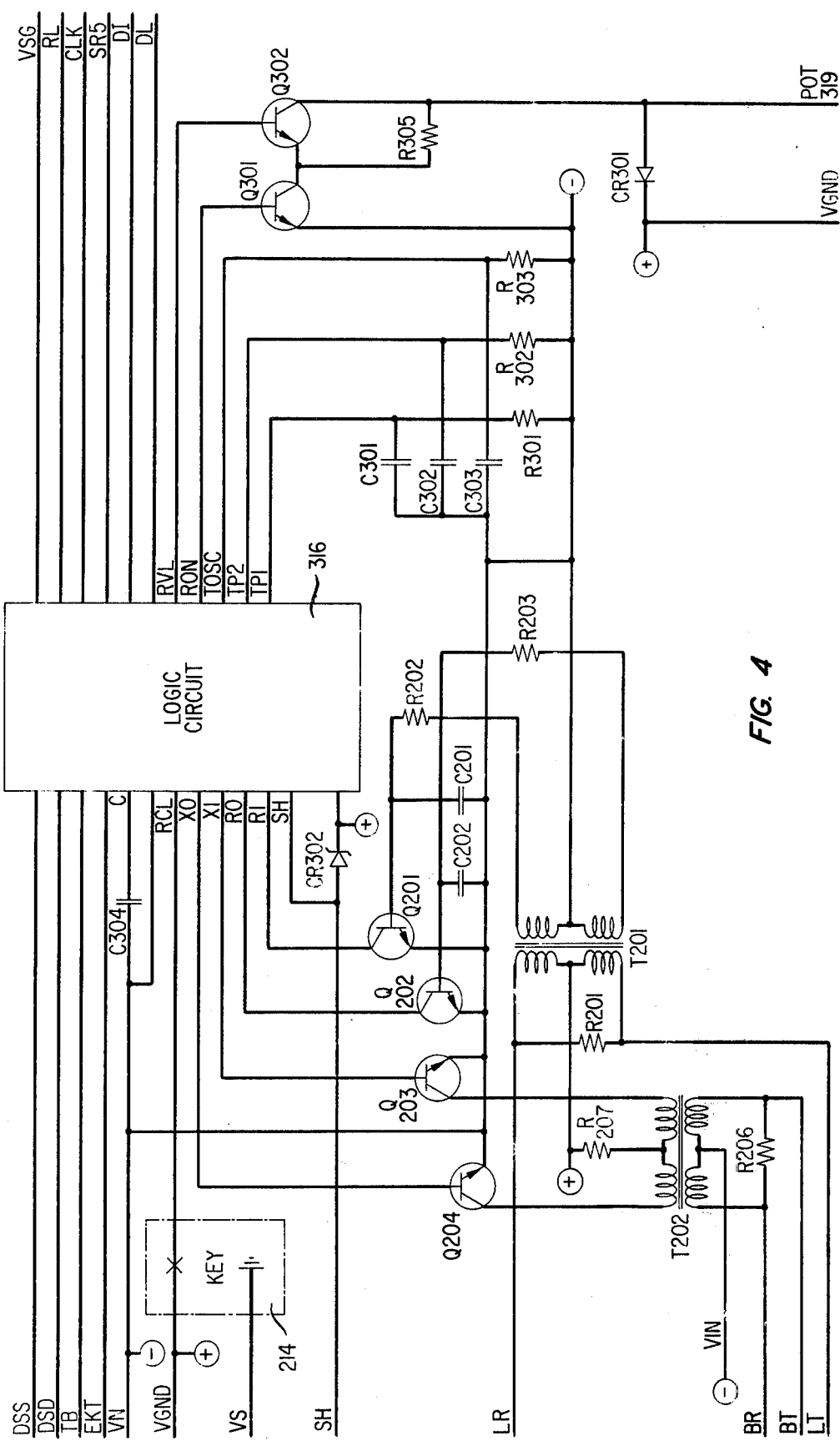
FIG. 4 illustrates the circuit for receiving digital data at the station set and for transmitting digital data from the station set.

Data transmitted in either direction between station set 110 and interface controller 111 is in a bipolar format. Consequently, the primary function of transmitter/receiver circuit 315, shown in more detail in FIG. 4, is to convert the bipolar pulses to two unipolar pulses upon reception or vice versa for transmission.

Consider first receiver operation. Transformer T201 in conjunction with transistors Q201 and Q202 and resistor R201 convert bipolar signals appearing on leads LR and LT into the unipolar signals. For example, if a bipolar 0 is received, the collector of transistor Q202 goes low first, followed by the collector of transistor Q201. Hence, two unipolar pulses are developed on leads R0 and R1 into logic circuit 316. Waveforms for these signals are shown on the timing chart of FIG. 8. For a bipolar 1 the waveforms are merely the inverse of those just described.

Resistor R203 and capacitor C202 form an RC-filter to remove any high frequency and impulse noise. Similarly, resistor R202 and capacitor C201 provide filtering in the circuit incorporating transistor Q201.

With regard to transmitter operation, positive unipolar signals coupled out of logic circuit 316 on leads X0 and X1 turn on transistors Q203 and Q204, the emitters of which are coupled to a negative power supply via lead VN. These signals, as shown in the timing chart of FIG. 8, develop across the output of transformer T202 the desired bipolar signal which is transmitted, in turn, to interface controller 111 via leads BR and BT. Timing for the transmitted bipolar signals is controlled by RC-networks. Specifically, the first transmit period is controlled by capacitor C301 and resistor R301 whereas the second transmit period is controlled by capacitor C302 and resistor R302.

Resistor R207 coupled between the center taps of transformers T201 and T202 limits the collector current drawn from the positive power supply. Capacitor C304 in lead VN is used to detect the end of a data word and subsequently to reset all flip-flop shift registers in preparation for the next data word. Impedance matching to the line in the receive mode is effected by resistor R201 and in the transmit mode by resistor R206. Diode CR302 protects against static voltages on the switchhook lead SH.

The remaining circuits, shown in FIG. 4, provide control for tone ringer 318, shown in FIG. 3. In particular, capacitor C303 and resistor R303 control the oscillation period. With transistors Q301 and Q302 turned on, there is a short circuit between lead VN and potentiometer 319 shown in FIG. 3. The current flowing between these two points drives a speaker (not shown). The input to transistor Q301 on lead RON provides on/off control for tone ringer 318. The input to transistor Q302 on lead RVL provides volume control. Thus, with transistor Q302 off and transistor Q301 on, the current is limited by resistor R305 to give the low volume condition for tone ringer 318.

When transistor Q301 is turned off, ringing ceases. However, current briefly flows around a loop containing diode CR301 until the current due to speaker inductance dissipates. Diodes CR301 is a flyback diode which prevents any overvoltage in the negative direction.

It should be noted that leads TB, RL, CLK, SR5, DI, and DL coupled to logic circuit 316 in FIG. 4 are leads 321 shown in FIG. 3.

Also, it should be noted that lead EKT couples to a switch (not shown) which is used to select the mode of operation of station set 110. Three modes of operation are available. In the first mode station set 110 functions as a multibutton electronic telephone. In the second mode it functions as an electronic custom calling telephone. The third mode of operation is a mix between the first two modes, that is, station set 110 is a multibutton telephone with a number of custom calling features available.

6. Logic Circuit

Figure 5A:
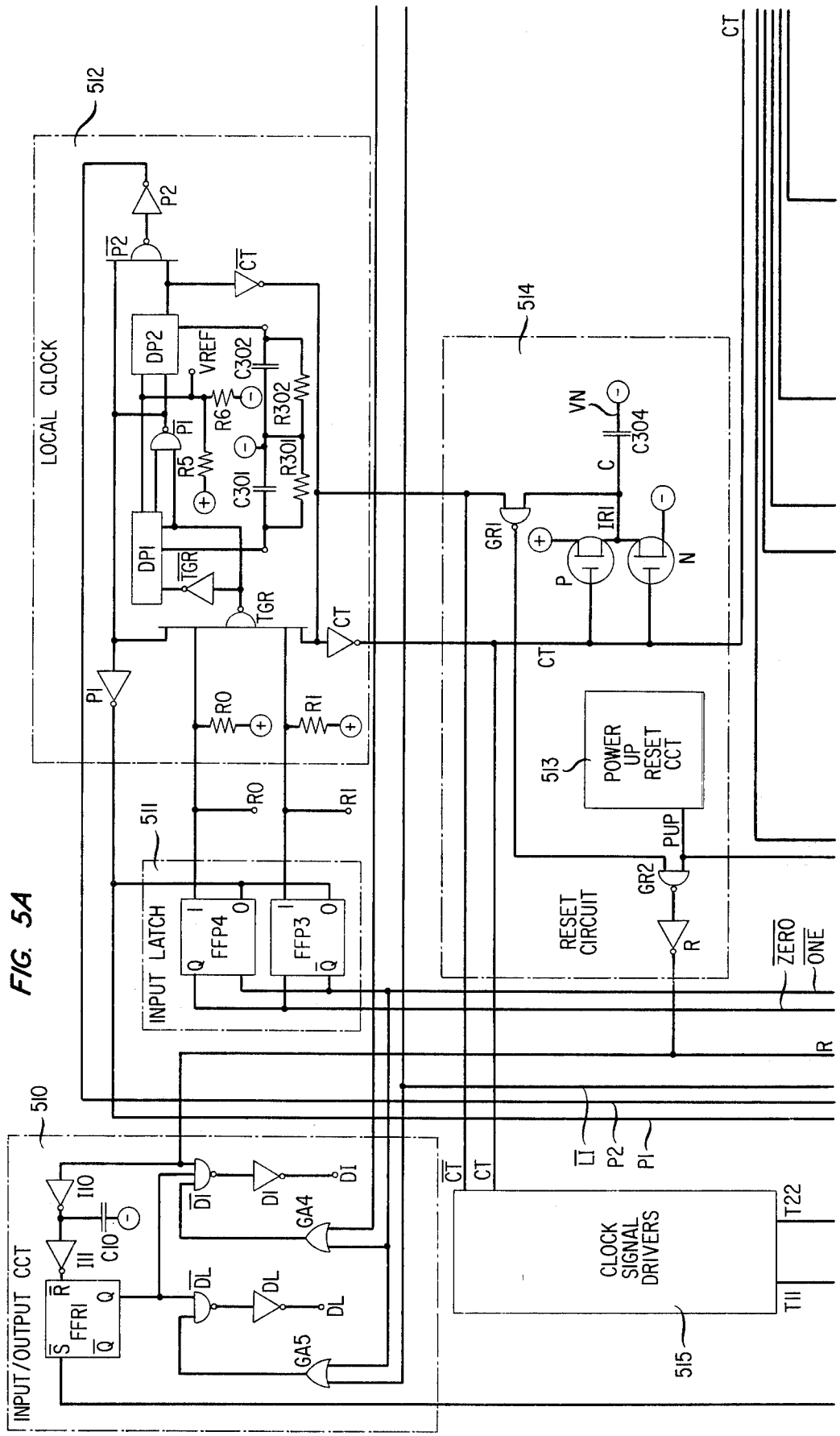
Figure 5B:
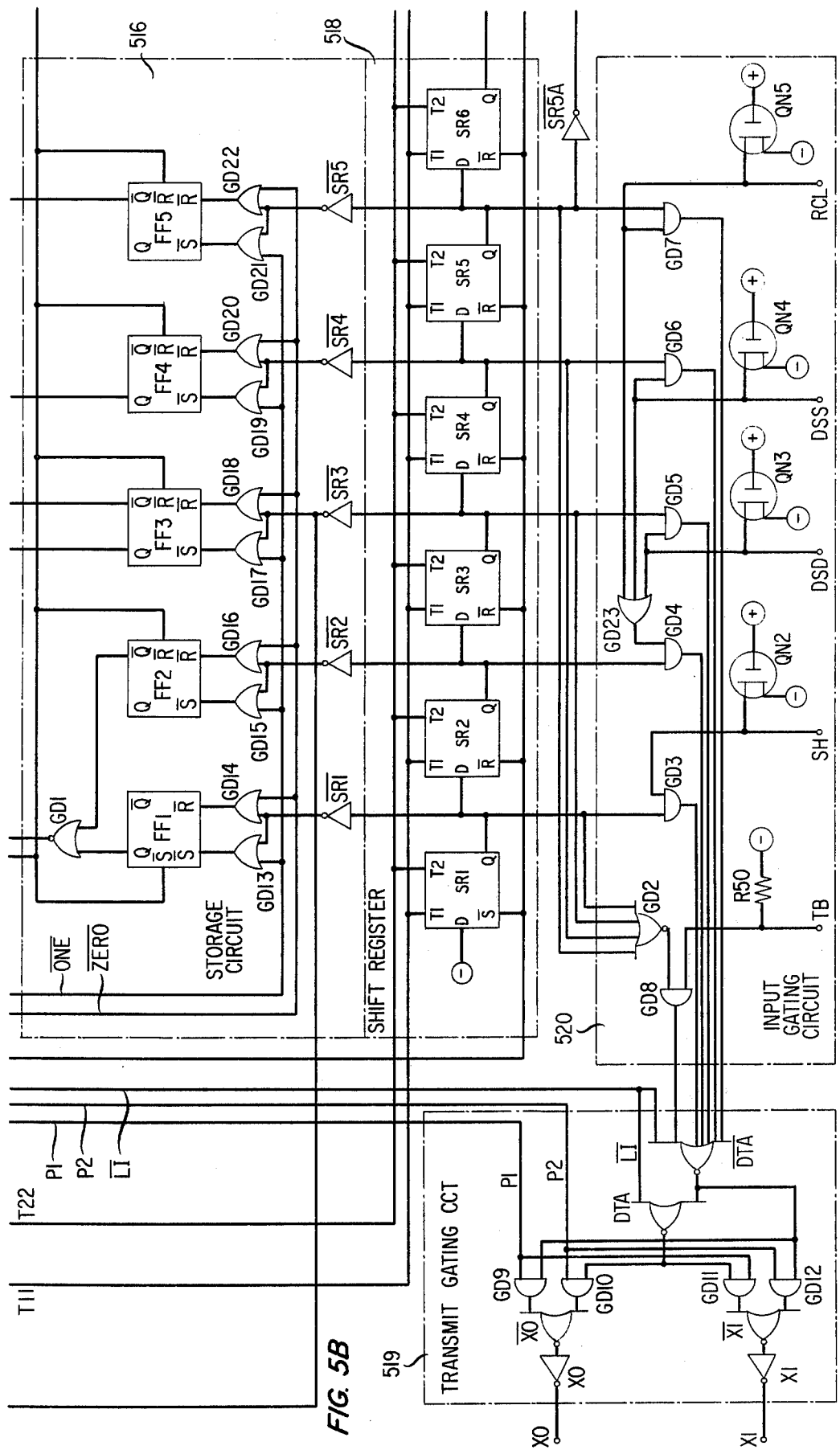

Logic circuit 316, as shown in FIGS. 5a, 5b, and 5c, when arranged in accordance with FIG. 5d, includes several major subcircuits such as input latch 511, local clock 512, reset circuit 514, storage circuit 516, shift register 518, input gating circuit 520, and mode selector circuit 521. Each of these circuits will be considered in more detail in the following subsections.

6.1 Reset Circuit

Reset circuit 514 performs two sets of functions. The first set of functions includes initialization of shift register 518, the resetting of all flip-flops in storage circuit 516, and generation of an RL pulse, as shown in the timing chart of FIG. 8, to turn off all LEDs in key assembly 317. The second function is to restore shift register 518 to its initial counting position following the reception of a complete data word from interface controller 111.

To implement the first set of functions, power-up reset circuit 513 develops a low logic signal and holds this signal on its output lead PUP as power is first applied. With a low on lead PUP, flip-flop FF1 in storage circuit 516 is set and flip-flops FF2 through FF5 in the same circuit are reset. In addition, NAND gate GR2 and inverter R are actuated to produce a low on lead R which sets flip-flops SR1 and resets flip-flops SR2 through SR6 in shift register 518. The low on lead R also sets flip-flop TGA1 and resets flip-flops FFA1 and TA2 in mode selector circuit 521. Simultaneously, a low via NAND gate $\overline{DI}$ and inverter DI appears on lead DI, and flip-flop FFR1 in input/output circuit 510 is reset via inverters I10 and I11 and capacitor C10 forcing lead DL low. This set of circuit changes puts logic circuit 316 in a rest state between data words so it is ready to accept the first bit of the first data word.

When the power supply voltage exceeds about 4.8 volts, the signal on lead PUP goes high. This signal removes the set or reset signals to flip-flops FF1 through FF5 in storage circuit 516. In addition, inverters IR4 and RL and NOR gate $\overline{RL}$ in input/output circuit 510 are actuated to produce a low on lead RL. In effect, power-up reset circuit 513 prevents excessive current drain when station set 110 is first turned on since all LEDs are held in an off state during this interval.

The remaining portion of reset circuit 514 produces a negative voltage on capacitor C304 in lead C of transmitter/receiver circuit 315 shown in FIG. 4. This voltage is held below a threshold so long as additional pulses are received within a data word. At the end of the word, the charge decays, the voltage goes above threshold, and a reset pulse is generated to reinitialize logic circuit 316 and key assembly 317. The effect of this operation is to restore the pointer function effected by shift register 518 to an initial position.

As a further part of the initialization effected by reset circuit 514, the setting of flip-flop FF1 and the resetting of flip-flop FF2 in storage circuit 516 prevents tone ringer 318 from going on when station set 110 first receives power. In fact, tone ringer 318 remains turned off so long as the output of NOR gate GD1 is low. This result obtains because with this level applied to transistor QP1 oscillation is inhibited.

Also, a low output from NOR gate GD1 resets flip-flops TSA, TSB, and TSC which, in turn, puts divide-by-two and divide-by-three circuits in tone ringer 318 in a proper state to initiate their counting sequences. The divide-by-two circuit is used in the production of the low frequency tone and is by-passed during the production of the high frequency tone. The divide-by-three circuit produces a one-third duty cycle thereby enhancing the harmonic content in the sound produced by tone ringer 318.

6.2 Local Clock

Local clock 512 takes the leading edge of each bit transmitted to logic circuit 316 and sets and adjusts the timing for each bit to be returned to interface controller 111. Pulses P1 and P2, as shown in the timing chart of FIG. 8, trigger transmit gating circuit 519 to return data from station set 110 to interface controller 111 on a delayed bit-by-bit basis under the control of shift register 518.

Included in local clock 512 are a pair of delay sections DP1 and DP2. These delay sections, when a high appears on their output, remain high for a time interval controlled by an external RC network. After this time interval, the output changes, and the delay section functions similar to an inverter. However, when the input returns to a low, the output of the delay section goes high almost instantaneously. Inverter $\overline{TGR}$ ensures a fast reset when delay section DP1 goes low.

A voltage, developed across resistors R5 and R6 and applied at the point designated $V_{ref}$ in local clock 512, establishes the trigger point where the delay produced by the RC network causes this change of state.

With a low received on lead R0, NAND gate TRG is forced high and the output of delay section DP1 is held high for the preselected delay interval after which it changes state. This delay interval is fixed by resistor R301 and capacitor C301 and is typically on the order of one microsecond. The input of delay section DP1 being held high forces NAND gate $\overline{P1}$ to remain low for the selected delay after which both delay section DP1 and NAND gate $\overline{P1}$ undergo a change of state. Consequently, the P1 pulses are generated and, following inversion by inverter P1, are applied to transmit gating circuit 519.

The P2 pulses are generated in a similar manner. With NAND gate $\overline{P1}$ low, the output of the inverter P2 is held low. When NAND gate $\overline{P1}$ goes high, the output of delay section DP2 remains high for the predetermined delay fixed by resistor R302 and capacitor C302 after which it changes to a low. NAND gate $\overline{P1}$ high initiates the leading edge of a P2 pulse which continues until delay section DP2 changes state at which point the P2 pulse ends.

Figures 8A, 8C:
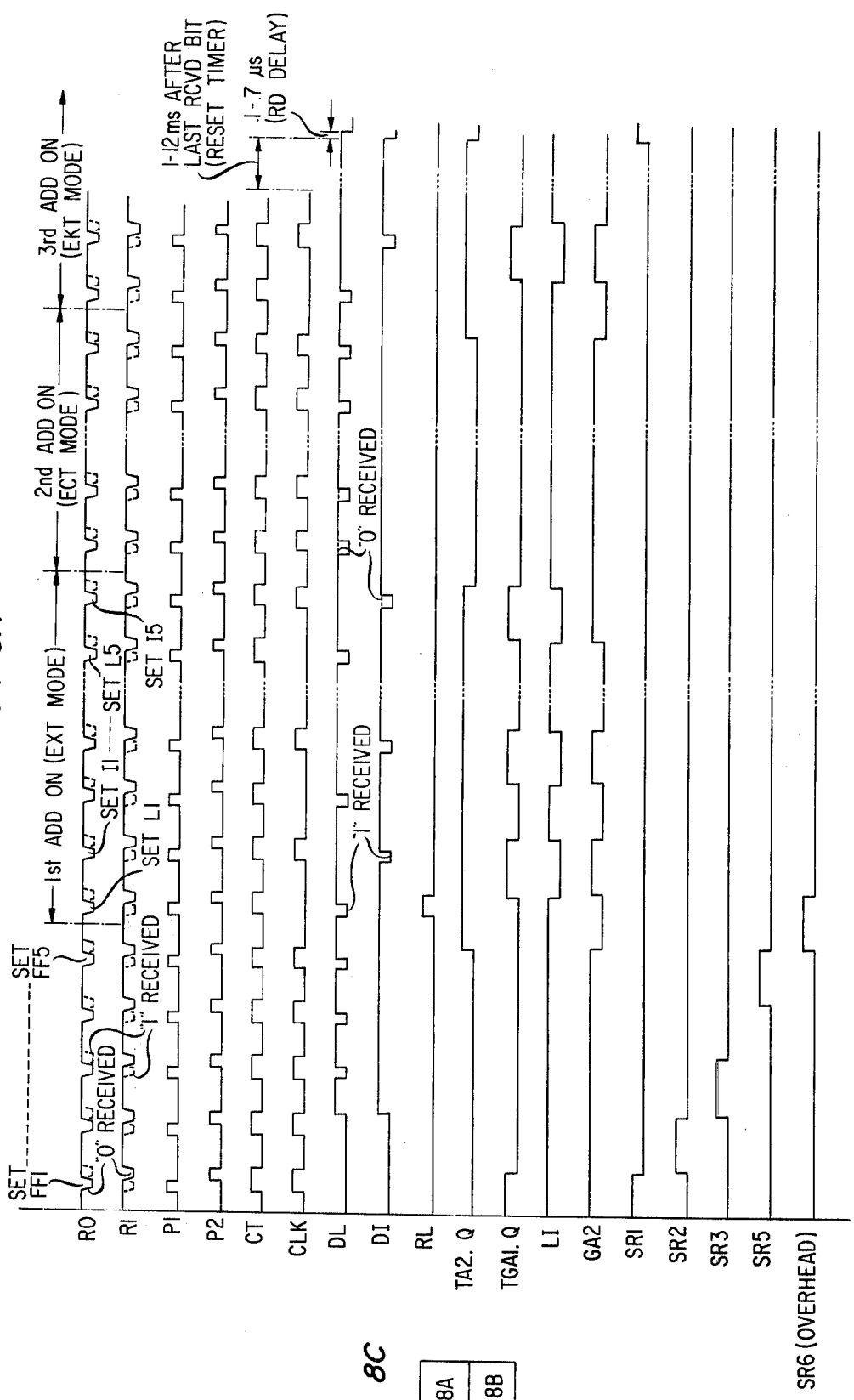
FIGS. 8a and 8b are arranged as shown in FIG. 8c, is a timing diagram.
Figure 8B:
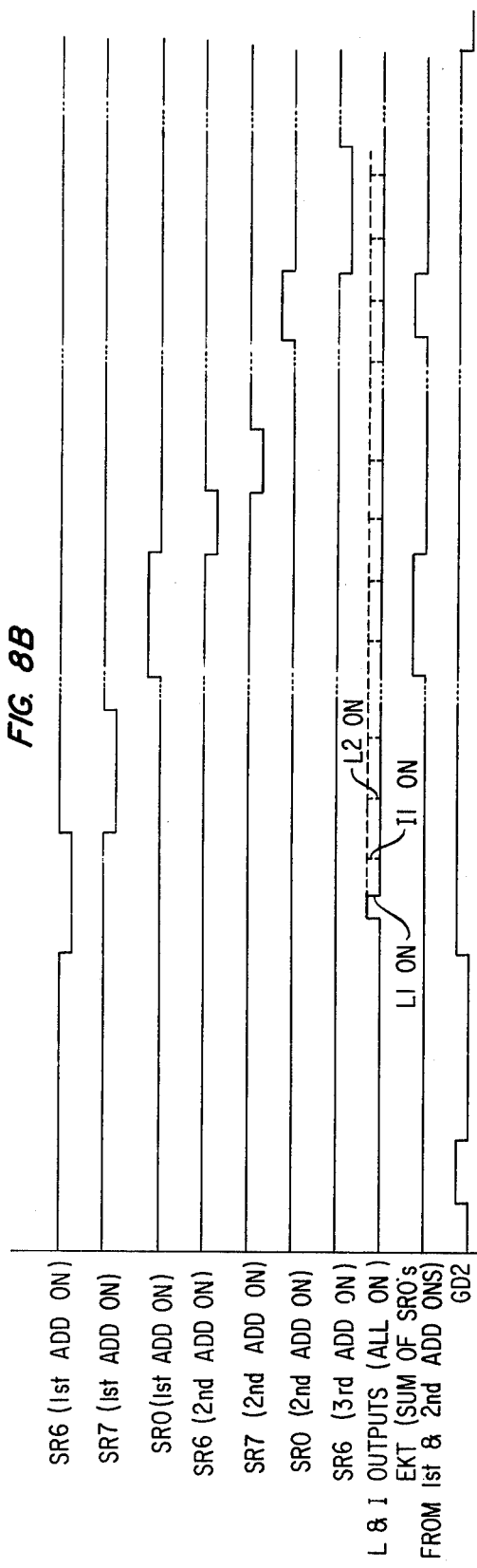
Figure 8B:
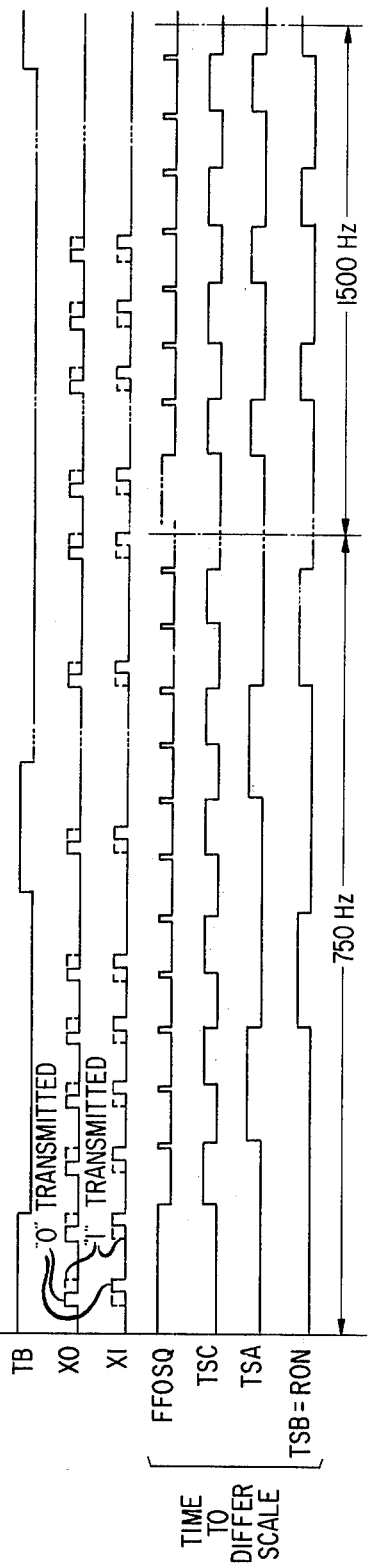

CT pulses, as shown in the timing chart of FIG. 8, start at the leading edge of a P1 pulse and are held for the duration of the P1 and P2 pulse interval because both delay sections DP1 and DP2 are utilized in the production of these pulses. For each received bit, whether high or low, new P1, P2, and CT pulses are generated. With the production of a CT pulse and its inversion by inverter $\overline{CT}$, NAND gate TGR is held high to prevent retriggering of delay sections DP1 and DP2 during the reception of each bit on leads R0 and R1.

Resistors R0 and R1 on leads R0 and R1 prevent the coupling of any stray voltages into local clock 512 which might inadvertently initiate the generation of new timing signals.

6.3 Input Latch

Input latch 511 is used to determine whether a high or a low is being received. Each bit received is held by input latch 511 but only for a P1 pulse period.

Flip-flops FFP3 and FFP4 form an edge triggered flip-flop and data on either leads R0 and R1 are locked into the flip-flop on the low to high transition of pulse P1. If a low is received, lead $\overline{ZERO}$ goes low during the P1 pulse and, likewise, if a high is received, lead $\overline{ONE}$ goes low for the P1 period. When the signal on lead P1 returns to a low, the signal appearing on leads $\overline{ONE}$ and $\overline{ZERO}$ are forced back to a high.

When the signal on lead CT goes high via inverter $\overline{CT}$, the N-channel device of circuit IR1 in reset circuit 514 is turned on and lead C is forced to a low. Circuit IR1 with a low at its output forces lead R, via a path including NAND gates GR1 and GR2 and inverter R, to a high. This removes all set and reset signals to flip-flops SR1 through SR6 in shift register 518; flip-flops TGA1, FFA1, and TA2 in mode selector circuit 521; and flip-flop FFR1 in input/ouput circuit 510.

6.4 Shift Register

Shift register 518, as noted previously, functions as a pointer for gating inputs from input gating circuit 520 to a data bus and out to transmit gating circuit 519. Additionally, shift register 518 gates any data in input latch 511 to storage circuit 516.

6.5 Input Gating Circuit

Input gating circuit 520 gates out information related to switchhook status, data stream dialing, direct station selection, recall, or other customer service activities implemented at station set 110. Upon generation of a reset sinal and application to lead R flip-flop SR1 in shift register 518 is actuated. Actuation of flip-flop SR1 enables OR gates GD13 and GD14 via inverter $\overline{SR1}$ to allow the $\overline{ONE}$ and $\overline{ZERO}$ pulses to set or reset, respectively, flip-flop FF1 in storage circuit 516. In addition, flip-flop SR1 enables AND gate GD3 to permit any data relating to switchhook status appreating on lead SH to be routed to transmit gating circuit 519 via AND gate GD8. It should be noted that the switchhook data is gated to NOR gates $\overline{DTA}$ and DTA in transmit gating circuit 519. Upon application of the P1 and P2 pulses to AND gates GD9 through GD12, this data is coupled out through either NOR gate $\overline{X0}$ or $\overline{X1}$ to transmitter/receiver circuit 315. Specifically, to transmit a logical low, when pulse P1 goes high lead X0 is forced high and when pulse P2 goes high, lead X1 is forced high for the duration of the P2 pulse. For example, if the switchhook status bit is high, lead X0 should be low during the P1 and lead X1 should be high. Correspondingly, during the P2 pulse lead X0 should be high and lead X1 should be low.

Following transmission of this bit, shift register 518 assumes its second pointer position through the actuation of flip-flop SR2 via clock signals T11 and T22 generated in clock signal drivers 515 upon reception of clock pulses CT and $\overline{CT}$. When the second bit of data is received from interface controller 111, logic circuit 316 is in condition to return its second bit to interface controller 111.

Upon receipt of the second bit, P1, P2, and CT pulses are generated in the same manner as previously described. The received data is held in input latch 511 regardless of whether a low or high is received. This in turn either sets or resets flip-flop FF2 which has been enabled by flip-flop SR2 via inverter $\overline{SR2}$ and OR gates GD15 and GD16. The enablement of flip-flop SR2 actuates AND gate GD4 so that data appearing on leads DSD, DSS, or RCL can be advantageously coupled out to transmit gating circuit 519 via OR gate GD23.

It should be noted at this point that the actuation of flip-flop SR2 enables the transmission of data appearing on any leads other than lead SH back to interface controller 111 in the second bit position. In fact, any activity including button depression or the like on station set 110, with the exception of activity involving the switchhook, is coupled to lead TB and is sent back to interface controller 111 in the second bit position. By so doing interface controller 111 is alerted that station set 110 is in use.

Any activity as indicated by signals on any of the aforementioned leads causes a high to be transmitted to interface controller 111. Coupling of this information to transmit gating circuit 519 is effected through a path including NOR gate GD2 and AND gate GD8. Information appearing on lead TB or any activity signified or controlled by the sixth bit onward is coupled out to transmit gating circuit 519 via this path since inputs from flip-flops SR1 and SR3 through SR5 are coupled to NOR gate GD2 which conrols the gating of this information.

At the end of the second CT pulse flip-flop SR3 goes high and flip-flop FFR1 is set. The setting of flip-flop FFR1 in input/output circuit 510 causes its Q output to go high. This forces NAND gates $\overline{DL}$ and $\overline{DI}$ low. Following signal inversion by inverters DL and DI this state change forces other changes to occur in key assembly 317.

With flip-flop SR3 enabled, flip-flop FF3 is either set or reset via inverter $\overline{SR3}$ and OR gates GD17 and GD18. Simultaneously, the information appearing on lead DSD is coupled through AND gate GD5 to transmit gating circuit 519. At the end of the third CT pulse shift register 518 advances its pointing so that on the fourth bit flip-flop SR4 is enabled, flip-flop FF4 is either set or reset via inverter $\overline{SR4}$ and OR gates GD19 and GD20, and the information appearing on lead DDS is gated to transmit gating circuit 519 via AND gate GD6.

At the end of the fourth CT pulse, flip-flop SR5 is enabled; FF5 is either set or reset via inverter $\overline{SR5}$ and OR gates GD21 and GD22; and the information appearing on lead RCL is gated to transmit gating circuit 519 via AND gate GD7.

At the end of the fifth CT pulse, flip-flop SR6 is enabled allowing lead RL to go high during the sixth CT pulse via AND gate GA3 and NOR gate RL. Lead RL high causes L-lamps and I-lamps to be turned off. At the end of the sixth bit flip-flop SR6 in shift register 518 disables AND gate GA3 and this in turn permits the L-lamps and I-lamps to be actuated.

It should be noted that transistors QN2 through QN5 function similar to a resistor such as resistor R50 to pull their associated leads low in the absence of data to prevent the coupling of any stray voltages to transmit gating circuit 519.

6.6 Storage Circuit

Storage circuit 516 stores the data received from the first five bits as noted above. Flip-flops FF1 through FF5 in storage circuit 516 are set or reset only by the data in the received data stream. These flip-flops remain in a static state until a change of state occurs in the data stream.

6.7 Mode Selector Circuit

As noted previously in Section 5 above, three modes of operation are available. In the first mode station set 110 functions as a multibutton electronic telephone. This mode is referred to as the EKT mode. In this mode for every even bit received after the first five bits a corresponding bit is transmitted back to interface controller 111.

In the second mode station set 110 functions as an electronic custom calling telephone. This mode is referred to as the ETC mode. This mode may be essentially characterized on the basis that for every bit received, one is transmitted back to interface controller 111.

The third mode, referred to as a "mixed" mode, enables station set 110 to function as a multibutton telephone with a number of custom calling features available. In this mode for every even bit received after a predetermined number, say $n$, a bit is transmitted; $n$ in this case corresponds to the number of buttons having two LEDs associated therewith, both of which are used.

Consider first the EKT mode, the former of which is illustrated in Table 1. At the end of the fifth bit flip-flop SR6 in shift register 518 goes high and this signal following inversion by inverter IA1 sets flip-flop FFA1. Flip-flop FFA1 going low with a signal on lead EKT being low allows flip-flop TA2 to toggle. During, the toggling output TA2.Q goes high and output TA2.$\overline{Q}$ goes low. This forces flip-flop TGA1 to begin toggling on the falling edge of a CT pulse. Output TGA1.Q goes high at the end of the sixth bit, eighth bit, and so on. At the end of the seventh bit, ninth bit, and so on, output TGA1.Q toggles to a low level.

During the sixth bit, eighth bit, and so on, output TGA1.Q is low and this inhibits OR gate GA2 preventing CT pulses from being gated out. However, CLK pulses are generated during the seventh bit, ninth bit, and so on. These pulses are illustrated in the timing chart of FIG. 8 as waveform CLK. Also shown thereon are the toggling waveforms of flip-flops TA2 and TGA1.

During odd bits, output TGA1.Q being high forces NAND gate LI low and inverter $\overline{LI}$ high. With NAND gate LI low, OR gate GA4 is enabled, allowing data to appear on lead DI. This is illustrated in the timing chart of FIG. 8 by waveforms DI and LI. At the same time, inverter $\overline{LI}$ high forces NOR gates $\overline{DTA}$ and DTA in transmit gating circuit 519 low thereby inhibiting the transmission of data on leads X0 and X1. It should be noted also that data is alternated on lead DL and then on lead DI, and so forth. This is clearly shown in the timing chart of FIG. 8.

A sample bit configuration for the ECT mode is shown in Table 2. In this instance, the signal on lead EKT is held high and after transmission through NOR gate GA6 forces flip-flop TA2 low preventing any toggling, that is, flip-flop TA2 is held reset. With flip-flop TA2 reset, NAND gate LI is forced high, OR gate GA2 is held high, and NOR gate GA1 is held low. NAND gate LI held high, forces OR gate GA4 in input/output circuit 510 high. This, in turn, forces NAND gate $\overline{DI}$ low. Following inversion by inverter DI a high logic level signal appears on lead DI.

TABLE 2

| ECT MODE | | LAMP AND BUTTON DATA DEFINITIONS | | | | | |
|---|---|---|---|---|---|---|---|
| | | Controlled State | | | | Controlling State | |
| Lamp Data Period | Controlled Function | "Zero" Lamp State | "One" Lamp State | Button Data Period | Controlling Function | "Zero" Button State | "One" Button State |
| 1 } | Ringer } | | | 1 | Switchhook | On-Hook | Off-Hook |
| 2 } | ON/OFF } | | | 2 | Button Common | # | # |
| 3 | Ringer Tone | 750 Hz | 1500 Hz | 3 | Data Stream Dialing | Open | Closed |

TABLE 2-continued

| ECT MODE | LAMP AND BUTTON DATA DEFINITIONS | | | | | |
|---|---|---|---|---|---|---|
| | Controlled State | | | | Controlling State | |
| Lamp Data Period | Controlled Function | "Zero" Lamp State | "One" Lamp State | Button Data Period | Controlling Function | "Zero" Button State | "One" Button State |
| 4 | Ringer Volume | Full | Reduced | 4 | Direct Sta. Selection | Open | Closed |
| 5 | Voice Signaling | OFF | ON | 5 | Recall | Open | Closed |
| 6 | L1 LED | OFF | ON | 6 | Button 1 | Open | Closed |
| 7 | L2 LED | OFF | ON | 7 | Button 2 | Open | Closed |
| 8 | L3 LED | OFF | ON | 8 | Button 3 | Open | Closed |
| 9 | L4 LED | OFF | ON | 9 | Button 4 | Open | Closed |
| 10 | L5 LED | OFF | ON | 10 | Button 5 | Open | Closed |
| 11 | L6 LED | OFF | ON | 11 | Button 6 | Open | Closed |
| 12 | L7 LED | OFF | ON | 12 | Button 7 | Open | Closed |
| 13 | L8 LED | OFF | ON | 13 | Button 8 | Open | Closed |
| 14 | L9 LED | OFF | ON | 14 | Button 9 | Open | Closed |
| 15 | L10 LED | OFF | ON | 15 | Button 10 | Open | Closed |

\# = "0" only if all subsequent button data bits "0".

Inverter $\overline{LI}$ being low enables OR gate GA5 so that if the $\overline{Q}$ output of flip-flop FFP3 in input latch 511 is low during the P1 period, that is, a logical 1 has been received, the signal on lead DL is forced low during the P1 period. It should be noted that leads DL and DI couple data from logic circuit 316 to key assembly 317.

During the time inverter $\overline{LI}$ is low, NOR gates DTA and $\overline{DTA}$ are enabled thereby allowing pulses to be transmitted on leads X0 and X1. While OR gate GA2 is held high, every CT pulse is gated out via NAND gate $\overline{CLK}$ and inverter CLK to lead CLK. This is illustrated in FIG. 8 by waveforms CT, CLK and GA2. Moreover, NOR gate GA1 being held low holds flip-flop TGA1 low.

Figure 7A:
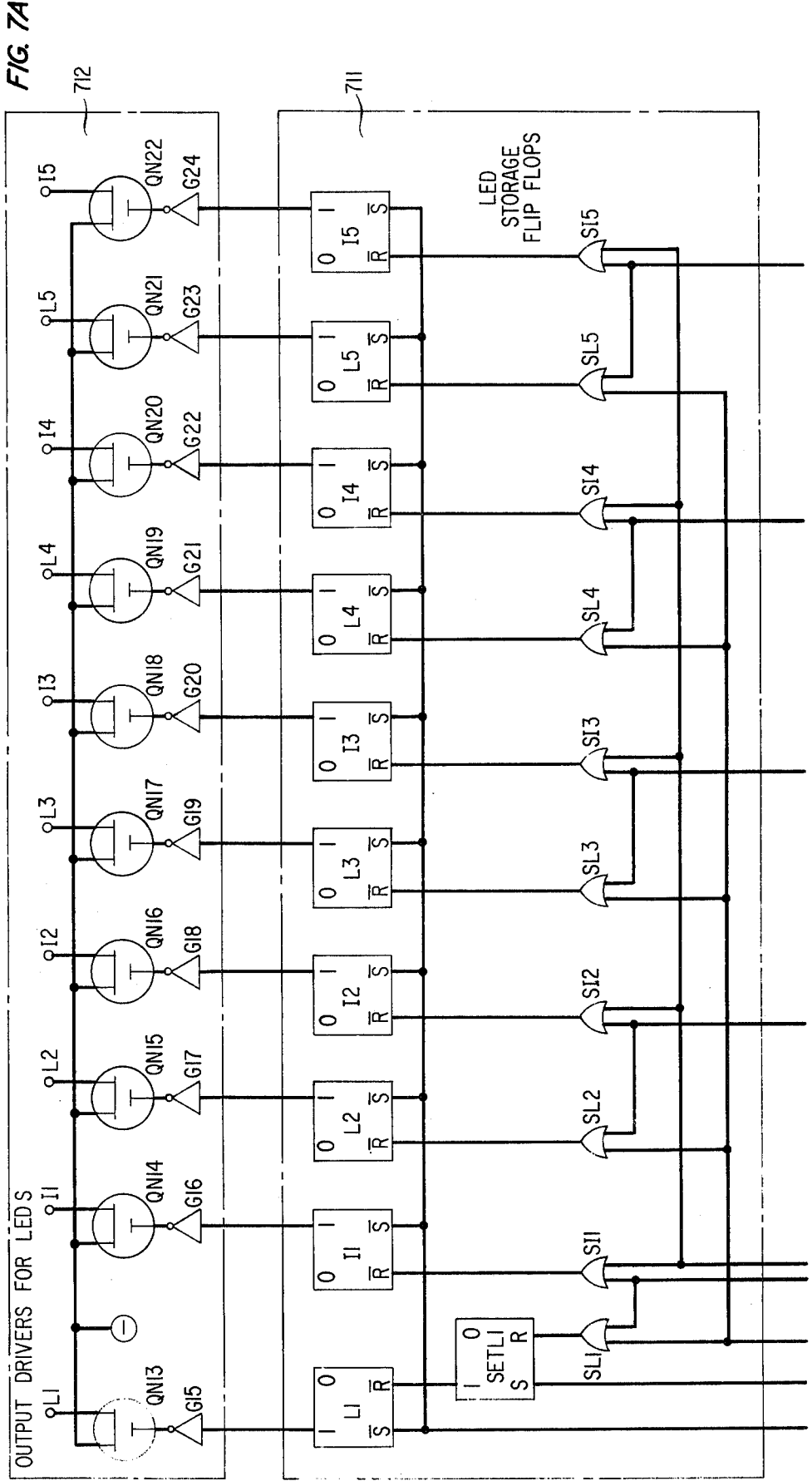

In the ECT mode, the fact that inverter $\overline{LI}$ is held low means that pulses are transmitted for every bit received. Therefore, data is only transmitted on lead DL and only the L flip-flop shown in FIG. 7 are set. This, in turn, means only the green LED lamps are lit. Additionally, since CLK pulses are generated on every received bit, flip-flops SR6 through SR10 in shift register 710 are actuated after every received bit.

Finally, consider the mixed mode. A sample bit configuration for this mode is shown in Table 3. In this mode the first five bits are the same as those in the ECT mode, then a shift is made into the EKT mode and, thence, back to the ECT mode. To shift to the ECT mode output SRO in shift register 710 is connected to input EKT in mode selector circuit 521 shown in FIG. 5.

When output SRO goes low, flip-flop TA2 toggles so that its Q output goes low. This forces NAND gate LI high which disables data from being transmitted on lead DI. With inverter $\overline{LI}$ low, data is transmitted on lead DL on the occurrence of each bit and also transmit gating circuit 519 is enabled thereby permitting data to be transmitted on leads X0 and X1.

TABLE 3

| MIXED MODE | LAMP AND BUTTON DATA DEFINITIONS | | | | | | |
|---|---|---|---|---|---|---|---|
| | Controlled State | | | | | Controlling State | |
| Lamp Data Period | Controlled Function | "Zero" Lamp State | "One" Lamp State | Button Data Period | Controlling Function | "Zero" Button State | "One" Button State |
| 1 | Ringer ON/OFF | | | 1 | Switchhook | On-Hook | Off-Hook |
| 2 | | | | 2 | Button Common | \# | \# |
| 3 | Ringer Tone | 750 Hz | 1500 Hz | 3 | Data Stream Dialing | Open | Closed |
| 4 | Ringer Volume | Full | Reduced | 4 | Direct Sta. Selection | Open | Closed |
| 5 | Voice Signaling | OFF | ON | 5 | Recall | Open | Closed |
| 6 | L1 LED | OFF | ON | 6 | Button 1 | Open | Closed |
| 7 | I1 LED | OFF | ON | *NT | | | |
| 8 | L2 LED | OFF | ON | 7 | Button 2 | Open | Closed |
| 9 | I2 LED | OFF | ON | NT | | | |
| 10 | L3 LED | OFF | ON | 8 | Button 3 | Open | Closed |
| 11 | I3 LED | OFF | ON | NT | | | |
| 12 | L4 LED | OFF | ON | 9 | Button 4 | Open | Closed |
| 13 | I4 LED | OFF | ON | NT | | | |
| 14 | L5 LED | OFF | ON | 10 | Button 5 | Open | Closed |
| 15 | I5 LED | OFF | ON | NT | | | |
| 16 | L6 LED | OFF | ON | 11 | Button 6 | Open | Closed |
| 17 | L7 LED | OFF | ON | 12 | Button 7 | Open | Closed |
| 18 | L8 LED | OFF | ON | 13 | Button 8 | Open | Closed |
| 19 | L9 LED | OFF | ON | 14 | Button 9 | Open | Closed |
| 20 | L10 LED | OFF | ON | 15 | Button 10 | Open | Closed |

\# = "0" only if all subsequent button data bits "0".
* = No Transmitted Bit.

As TA2 toggles, its $\overline{Q}$ output goes high which forces NOR gate GA1 low. This, in turn, holds flip-flop TGA1 low so that OR gate GA2 is continuously enabled and NAND gate LI is forced high. This constitutes a return to the ECT mode and, therefore, a CLK pulse is produced for each bit.

It should be noted that flip-flop TA2 can be advantageously toggled back to a reset condition on the falling edge of another pulse on lead EKT to put logic circuit 316 back into the EKT mode.

Transistor QN6 at the input of lead EKT has a function similar to transistors QN2 through QN5, that is, to prevent inadvertent logic changes by stray voltages.

6.8 Tone Ringer

Tone ringer 318 is comprised of four basic circuits: an oscillator circuit, a divide-by-two circuit, a divide-bythree circuit, and an RC network. When the first two bits received from interface controller 111 are a low logic level followed by a high logic level, flip-flop FF1 in storage circuit 516 is reset and flip-flop FF2 is set forcing NOR gate GD1 high. This causes transistor QP1 in tone ringer 318 to go off allowing the signal on lead TOSC to drift in level towards zero controlled by the RC time constant fixed by resistor R303 and capacitor C303. When the signal level is determined by differential amplifier DIF2 to be less than a reference voltage designated as $V_{ref}2$, established by resistors R2, R3 and R4, inverter $\overline{DIF2}$ goes low resetting flip-flop FFOS. The resetting of flip-flop FFOS turns transistor QP2 on quickly bringing the signal on lead TOSC positive. When this signal is determined by differential amplifier DIF1 to be greater than a reference voltage designated $V_{ref}1$, established by resistors R2, R3 and R4 the signal on lead DIF1 goes low setting flip-flop FFOS. This forces transistor QP2 off again allowing the signal on lead TOSC to drift towards zero. Hence, oscillation is established. The waveform produced is illustrated on the timing chart in FIG. 8 as FFOSQ.

As noted previously, the oscillation period is set by an RC network and the frequency generated is approximately 4500 Hz. If the third data bit is a low logic level, flip-flop FF3 in storage circuit 516 is reset causing a high to be applied to AND gate GS4 and a low to be applied to AND gate GS5. Since the $\overline{Q}$ output of flip-flop FFOS is coupled to flip-flop TSC and AND gate GS5, this results in the division of the signal on lead TOSC by a factor of two. In the event the third data bit is a high logic level, AND gate GS5 is forced high and AND gate GS4 is forced low. The signal on the $\overline{Q}$ output of flip-flop FFOS in this case passes through AND gate GS5 and NOR gate GS3 without being divided. The only effect is signal inversion.

Flip-flops TSA and TSB along with gates NAND GS1 and GS2, and OR gate GS6 form a divide-by-three circuit to produce a one-third duty cycle to enhance the harmonic content of the signal generated by tone ringer 318. Initially, both flip-flops TSA and TSB are low with OR gate GS6 inhibiting flip-flop TSB. The $\overline{Q}$ output of flip-flop TSB enables NAND gate GS1 forcing flip-flop TSA to toggle on the next pulse. Hence, flip-flop TSA goes to a high state and the Q output of flip-flop TSB remains in a low state. With flip-flop TSA high, OR gate GS6 is enabled and the $\overline{Q}$ output of flip-flop TSB remains high. Since NAND gate GS1 remains enabled, the next pulse toggles both flip-flops TSA and TSB. Flip-flop TSA forced back to a low state and flip-flop TSB going to a high state enables OR gate GS6 and the $\overline{Q}$ output of flip-flop TSB is driven low. This inhibits NAND gate GS1 so that on the next pulse flip-flop TSB toggles but not flip-flop TSA. At this point the circuitry returns to its initial state.

The output from the divide-by-three circuit is coupled via inverter RON to lead RON. Since the basic oscillation frequency was 4500 Hz the divide-by-three circuit reduces this frequency to 1500 Hz. Furthermore, if the divide-by-two circuit is actuated, a further reduction in frequency is effected, this frequency being 750 Hz.

The volume of the tone ringer signal is under the control of the fourth bit in the data word. This bit controls flip-flop FF4, the Q output of which is coupled via inverter RVl to lead RVL. Voice signalling is under the control of the fifth bit in the data word. In this case the Q output of flip-flop FF5 is coupled out via inverter VSG to lead VSG.

7. Key Assembly

Figure 6:
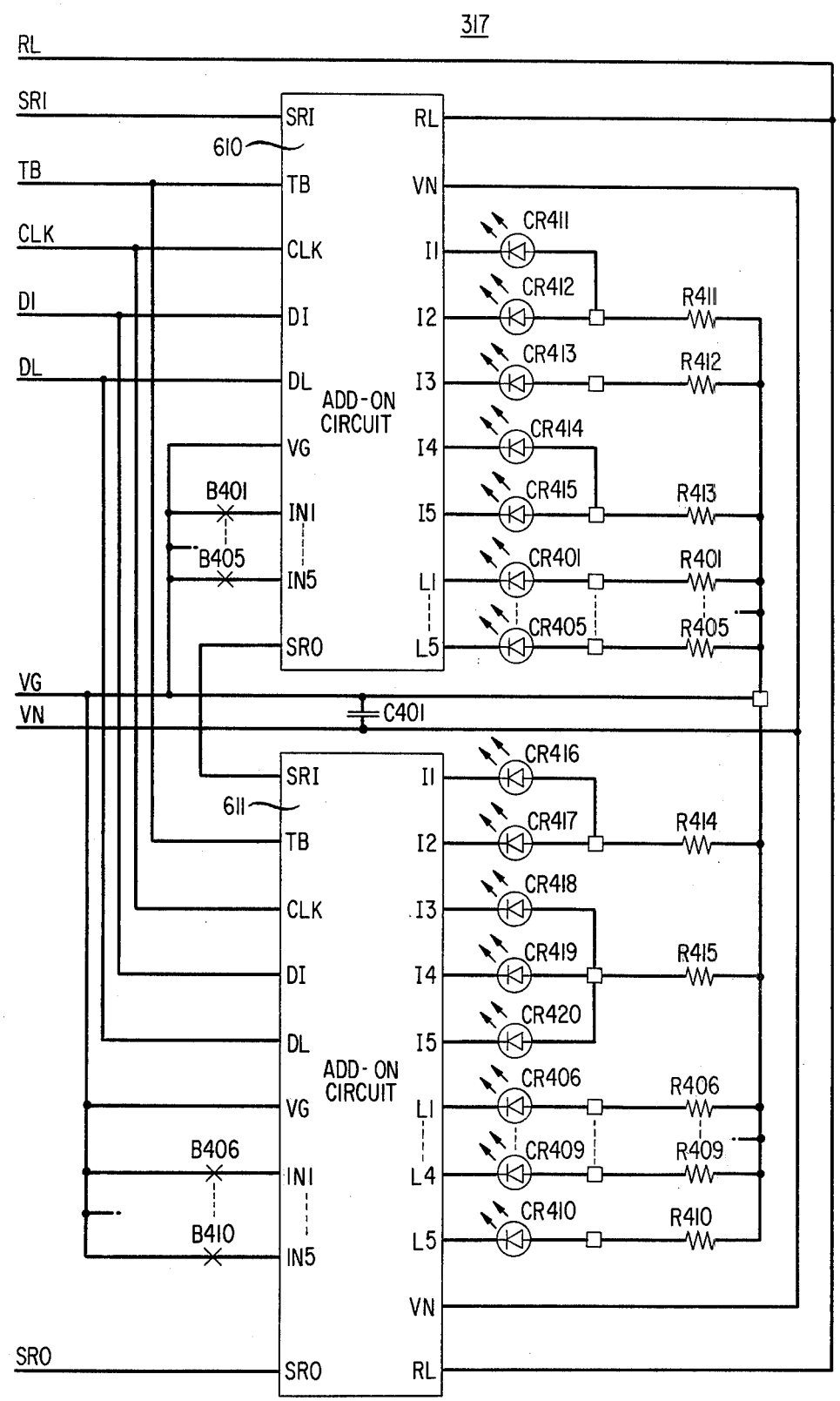
FIG. 6 illustrates the light emitting diode lamp circuit and the technique utilized to increase the number of keys with lamps on the station set.

Key assembly 317 is shown in a simplified schematic form in FIG. 6. Each button 210 on station set 110, as noted previously, has associated therewith two LED lamps 211 and 212, as shown in FIG. 2. One of these lamps provides a visual display as to which button has been selected by a user whereas the other lamp provides a visual display of which ones of the lines having an appearance on station set 110 are in use at other locations. For purposes of the following discussion these lamps will be referred to as I-lamps and L-lamps.

In the preferred embodiment, groups of five of each of the two types of lamps are controlled by a single add-on circuit 610. For example, the first five buttons on station set 110 are illustrated in FIG. 6 by normally open contacts B401 through B405. Associated with each of these buttons are five I-lamps CR411 through CR415 and five L-lamps CR401 through CR405. Resistors R401 through R405 and R411 through R413 merely limit the amount of current coupled to the LED lamps.

To provide a second group of five buttons and their associated lamps, a second add-on circuit 611 is used. In this case the five additional buttons are denoted by normally open contacts B406 through B410. The I-lamps are illustrated as LEDs CR416 through CR420, and the L-lamps are illustrated by LEDs CR406 through CR410. Again, resistors R406 through R410 and R414 merely provide a current limiting function. Capacitor C401 provides filtering for the power supply voltage. Typical values for all resistors and capacitors used in the station set circuit are set out in Table 4.

TABLE 4

| Resistors | |
|---|---|
| R0 = 1.2KΩ | R410 = 205Ω |
| R1 = 1.2KΩ | R411 = 205Ω |
| R2 = 9.33KΩ | R412 = 205Ω |
| R3 = 2.67KΩ | R413 = 205Ω |
| R4 = 4.0KΩ | R414 = 205Ω |
| R5 = 20KΩ | R415 = 205Ω |
| R6 = 10KΩ | |
| | Capacitors |
| R50 = 1.25–2.5KΩ | |
| R201 = 120Ω | C10 = 2pf |
| R202 = 220Ω | C201 = 330pf |
| R203 = 220Ω | C202 = 330pf |
| R206 = 240Ω | C301 = 100pf |
| R207 = 17.8Ω | C302 = 100pf |
| R301 = 6.6KΩ | C303 = 383pf |
| R302 = 6.69KΩ106 | C304 = 1000pf |
| R303 = 1.01MΩ | C401 = 0.01μf |
| R305 = 1KΩ | |
| R401 = 205Ω | |
| R402 = 205Ω | |
| R403 = 205Ω | |
| R404 = 205Ω | |
| R405 = 205Ω | |
| R406 = 205Ω | |
| R407 = 205Ω | |
| R408 = 205Ω | |
| R409 = 205Ω | |

It should be evident from the foregoing that additional sets of buttons and lamps in basic groups of five can be advantageously added to station set 110 without having to modify any of the circuits in logic circuit 316.

FIG. 7 illustrates one of the add-on circuits 610 or 611 shown in FIG. 6. Each of these circuits is comprised of five basic subcircuits. These are shift register 710, LED storage flip-flops 711, output drivers for LEDs 712, input buffer and gating circuit 713, and button input gating circuit 714.

Shift register 710 functions as a pointer similar to shift register 518 in logic circuit 316. Inverter G35 is a driver which enables signals coupled out on lead SRO to be at a proper signal level for cascading with an additional add-on circuit SRI input.

Transmission gate TG and inverter G4 hold the state of the input on lead SRI during a CLK pulse. The SRI input corresponds to the Q output from flip-flop SR5 in shift register 518, as shown in FIG. 5. As indicated in FIG. 5, this signal is coupled through inverters $\overline{SR5A}$ and ISR5 prior to their application to add-on circuit 610, as shown in FIG. 6. Transmission gate TG and inverter G4 prohibit any timing race conditions when the signal on lead CLK is high.

Two basic functions are performed by shift register 710. The first function is to point to one of the inputs IN1 through IN5 of button input gating circuit 714 so that button status information coupled into this latter circuit may be gated out to lead TB and, thence, to transmission gating circuit 519, shown in FIG. 5. Shift register 710 also points to LED storage flip-flops 711 so that the L-lamps and I-lamps are lit when appropriate. For example, flip-flop SR6 points to flip-flops L1 and I1, flip-flop SR7 points to flip-flops L1 and I2, and so forth.

As noted previously, the power-up reset circuit 513 generates a signal which is coupled out via inverter IR4 and NOR gate $\overline{RL}$ to lead RL. This signal, following inversion by inverter G1, resets flip-flops L1 through L5 and I1 through I5 in LED storage flip-flops 711. Signals generated in logic circuit 316 and delivered on lead CLK are coupled into add-on circuit 610 through a pair of inverters C11 and C12. Inverters C11 and C12 cooperate to form a two-phase clock to drive flip-flops SR6 through SR10 in shift register 710. Note inverters C11 and C12 also drive transmission gate TG which, in turn, drives inverter G4 to initialize flip-flop SR6.

Signals delivered on input leads CLK, DL, and DI are combined by NAND gates D12 and D13 to drive other circuits to produce additional signals. Specifically, when signals on leads DL and DI are low they are inverted by inverters G3 and G6 and applied to NAND gate D11 which develops a reset pulse. This reset pulse is delivered via lead RSR1 to several locations. First, it is coupled to flip-flops SR6 through SR10 to reset the shift register pointer. Second, it is coupled to NAND gates D6 through D10 in button input gating circuit 714 to gate the inputs on leads IN1 through IN5 to the output lead TB should any of the buttons B401 through B405 be depressed. This information is gated out on leads X0 and X1 in the second bit position. Finally, lead RSR1 is coupled to SETL1 flip-flop which is reset by the signal generated by NAND gate D11.

It should be noted at this point that signals delivered to input DL control flip-flops L1 through L5 whereas signals delivered on input DI provide corresponding control for flip-flops I1 through I5. It should also be recalled that in the EKT mode these signals alternate and the flip-flops SR6 through SR10 only change state on the falling edge of signals on lead CLK. Specifically, at the end of the fifth bit flip-flop SR6 in shift register 518 goes high and this enables AND gate GA3 to allow the sixth CT pulse to be gated to lead RL via NOR gate $\overline{RL}$ and inverter RL. The RL pulse, after inversion by inverter G1, resets all LED lamps so that they are in an off state. At the end of the RL pulse flip-flop L1 is set if a high is received on the sixth bit. For the ECT mode, it should be recalled that the signal on lead DI is always forced high.

When NAND gates D6 through D10 are sequentially enabled, NAND gates D1 through D5 are also enabled so that any button B401 through B405 operation will cause corresponding inputs IN1 through IN5 to go high. Regardless of which button is depressed, NAND gate G14 is forced high either directly or via NAND gates G7 and G8 and NOR gate G9. Following inversion of the output of NAND gate G14 by inverter D17, transistor QP7 is forced on and this brings lead TB high. All of the above occurs during sampling of the second bit button common data period and also during all button data periods after the fifth bit.

If a low logic level signal is received on leads DL or DI in the appropriate time interval, one of lamps CR401 through CR410 will come on. For example, for the L1 and I1 lamps, flip-flop SR6, low during the sixth bit, enables OR gates SL1 or SI1, sets flip-flop SETL1, sets flip-flops L1 and I1, the former being set when the RL signal is removed. With flip-flop L1 set, to follow the example, a high logic signal is delivered to transistor QN13 via driver G15 which turns on lamp L1. Similarly, the remaining lamps I1 through I5 and L2 through L5 would be lit in corresponding fashion with flip-flops SR7 through SR10 enabling OR gates SL2 through SL5 and SI2 through SI5 which in turn would enable the associated flip-flops L2 through L5 and I2 through I5, respectively.

Transistors QN13 through QN22 are off when a logical low is applied, and on when a logical high is applied. Each of the aforementioned devices is coupled to a corresponding driver G15 through G24. Transistors QN1 through QN5 in buttton input gating circuit 714 perform a similar function to transistors QN1 through QN5 in input gating circuit 520.

8. Summary

An electronic key telephone set circuit which enables key telephone functions to be effected at a station set under data stream control has been described. The circuit includes a nonlocking pushbutton switch and a pair of lamps, for example red and green colored LED lamps, for each apparent telephone line having an appearance on the station set. Included in the circuit is a dual frequency, dual volume tone ringer which facilitates differentiation of calls originated within the PBX system from those originated outside.

In all cases it is to be understood that the above described embodiment is illustrative of but a small number of many possible specific embodiments which can represent applications of the principles of the invention. Thus, numerous and other embodiments can readily be devised in accordance with these principles by those skilled in the art without departing from the spirit and scope of the invention.

What is claimed is:

1. Key telephone station set circuitry including:
   means for selecting one of a plurality of apparent telephone lines having an appearance at the station set;
   means, responsive to said selecting means, for producing digital data indicating which one of said apparent telephone lines is selected;
   means, responsive to digital data transmitted to said station set, for producing an indication of which one of said apparent telephone lines is selected and which ones of said apparent telephone lines are in an operational mode at other station sets having in common said plurality of apparent lines;
   means for generating an alerting signal; and
   means, further responsive to said digital data transmitted to said station set, for controlling a volume and a frequency of oscillation of said alerting signal indicating an incoming call to said station set.

2. Key telephone station set circuitry in accordance with claim 1 wherein
said selecting means includes a plurality of nonlocking pushbutton switches, and
said indication producing means includes first and second pluralities of light emitting diode lamps, said first plurality of lamps producing one color of light and said second plurality of lamps producing another color of light different from said one color.

3. Key telephone station set circuitry in accordance with claim 1 further including
means for detecting said digital data and a phantomed power signal transmitted to said station set over a common signal path,
means for separating said digital data from said phantomed power signal,
means for decoding said digital data into unipolar logic signals for actuating said indication producing means, and
means for recalling an operator independently of switchhook status.

4. Key telephone station set circuitry in accordance with claim 3 wherein said decoding means includes
means for inductively coupling said transmitted digital data into said station set,
switching means, responsive to said inductively coupled data, for converting said data into two separate unipolar digital signals, and
means for filtering said separate unipolar signals to remove high frequency and impulse noise.

5. Key telephone station set circuitry in accordance with claim 4 wherein said means responsive to said selecting means for producing digital data includes
means, responsive to said two separate unipolar digital signals, for synthesizing bipolar digital signals indicative of the status of said selecting means,
means, coupled to said synthesizing means, for controlling the duration of said bipolar digital signals, and
means for inductively coupling said bipolar signals out of said station set.

6. Key telephone station set circuitry in accordance with claim 5 further including
means for storing said digital data transmitted to said station set,
means, responsive to said stored digital data, for generating a plurality of internal timing signals,
means, responsive to said timing signals, for selectively interrogating a plurality of circuits each of which produces a separate status signal, and
means, responsive to said timing signals and ones of said separate status signals, for sequentially gating said status signals to said synthesizing means.

7. Key telephone station set circuitry in accordance with claim 6 wherein said timing signal generating means includes
first and second delay sections each of which with a high signal level at its input holds a high signal level at its output for a predetermined time interval after which its output goes to a low signal level and with a low signal level at its input its output goes to a high signal level almost instantaneously,
means for coupling said first delay section to said second delay section,
means, coupled to said delay sections, for controlling said predetermined time interval, and
means for applying a reference voltage between said first and second delay sections to establish a trigger point where said predetermined time interval causes said high to low signal transition at said first delay section output.

8. Key telephone station set circuitry in accordance with claim 6 wherein said storing means includes,
a plurality of flip-flops having set and reset inputs, each flip-flop holding an individual data bit of a plurality of such bits of decoded digital data,
means for coupling said individual data bits to separate ones of said plurality of flip-flops, and
means for sequentially enabling said coupling means to gate said plurality of said individual data bits to said separate ones of said plurality of flip-flops.

9. Key telephone station set circuitry in accordance with claim 8 wherein said coupling means includes
first and second pairs of OR gates each gate having first and second inputs and an output, said first gate of said pair of gates having a first type of decoded digital data bit coupled to said first input and said second gate of said pair of gates having a second type of decoded digital data bit coupled to said first input, said first and second gate second inputs of each pair of gates being coupled together, and
means for coupling said output of said first gate of each pair of gates to said set input of one of said flip-flops and said output of said second gate of each pair of gates to said reset input of one of said flip-flops.

10. Key telephone station set circuitry in accordance with claim 9 wherein said means for sequentially enabling said coupling means includes
a plurality of tandemly coupled flip-flops, each flip-flop having first and second clock inputs, a data input and an output, said output of one flip-flop being coupled to said data input of an adjacent flip-flop,
means for coupling said timing signals to each of said flip-flops first and second clock inputs, and
inverting means for coupling each of said flip-flop outputs to said second inputs of a corresponding pair of said OR gates.

11. Key telephone station set circuitry in accordance with claim 6 wherein said interrogating means includes
a plurality of tandemly coupled flip-flops, each flip-flop having first and second clock inputs, a data input of an output, said output of one flip-flop being coupled to said data input of an adjacent flip-flop,
means for coupling said timing signals to each of said flip-flops first and second clock inputs,
a plurality of AND gates, each of said gates having first and second inputs and an output,
means for coupling an output of each of said flip-flops to said first gate input,
means for coupling separate ones of said status signals to separate ones of said second gate inputs, and
means for coupling all outputs of said AND gates to said sequential gating means.

12. Key telephone station set circuitry in accordance with claim 1 wherein said means for generating an alerting signal includes
first and second transistors each transistor having a gate lead, a source lead, and a drain lead,
means for coupling a supply voltage to said source lead of each transistor,
means for coupling said drain lead of said first transistor to said drain lead of said second transistor, means, responsive to a pair of individual bits of said digital data, for developing a signal to turn off said first transistor, means for coupling said signal to said gate lead of said first transistor, means for controlling a time interval during which said signal on said coupled drain leads decays toward a first reference voltage, means for detecting when said signal on said coupled drain leads is less than said first reference voltage, means, responsive to said detecting means, for generating a signal to turn on said second transistor via its gate lead, means for detecting when said signal on said coupled drain leads is greater than a second reference voltage, said last-mentioned detecting means causing said generating means to change state and turn off said second transistor.

13. Key telephone station set circuitry in accordance with claim 12 wherein said means for controlling a frequency of oscillation includes means, responsive to an individual bit of said digital data, for selectively dividing by a factor of two a frequency of said signal produced by said generating means, and means for dividing by a factor of three said signal produced by said generating means to enhance a harmonic content of said signal.

14. Key telephone station set circuitry in accordance with claim 1 further including means for selecting one of a plurality of modes in which said station set may be advantageously configured to accept said digital data transmitted to said station set and to produce digital data indicating which one of said apparent telephone lines is selected.

15. Key telephone station set circuitry in accordance with claim 3 wherein said indication producing means includes a plurality of light emitting diode lamps, one half of said lamps being of a first color to indicate which one of said apparent telephone lines is selected and another half of said lamps being of a second color to indicate which ones of said apparent telephone lines are in an operational mode at other station sets having in common said plurality of apparent lines, means, responsive to said digital data transmitted to said station set, for selectively energizing said lamps in accordance with usage of said apparent lines, and means for limiting an amount of drive current applied to each of said light emitting diode lamps.

16. Key telephone station set circuitry in accordance with claim 15 wherein said selective energizing means includes means for storing said unipolar logic signals for actuating said lamps, means for applying a direct drive to said lamps, and means for sequentially gating said storing means to couple said logic signals to said drive means.

* * * * *

UNITED STATES PATENT AND TRADEMARK OFFICE
CERTIFICATE OF CORRECTION

PATENT NO. : 4,046,972

DATED : September 6, 1977

INVENTOR(S) : Donald Dean Huizinga, Edward William Underhill, and James Arthur Whitcomb It is certified that error appears in the above-identified patent and that said Letters Patent are hereby corrected as shown below:

Column 3, line 18, "11" should read --111--; line 23, "115m" should read --115-m--. Column 6, line 61, "the" should read --two--. Column 10, line 19, "sinal" should read --signal--. Column 11, line 27, "DDS" should read --DSS--; line 44, between "voltages" and "to" insert --back--. Column 12, line 5, "ETC" should read --ECT--. Column 15, line 68, "RV1" should read --RVL--; line 69, "fifthbit" should read --fifth bit--.. Column 16, line 30, between "R414" and "merely" insert --and R415--; line 48, in Table 4 that part of the line which reads "R302 = 6.69KΩ106" should read --R302 = 6.69KΩ--. Column 17, line 21, "L1" should read --L2--. Claim 5, line 36 (column 19) delete "said". Claim 11, line 48 (column 20), "of", first occurrence, should read --and--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks